United States Patent
Büttner et al.

(10) Patent No.: US 12,101,258 B2
(45) Date of Patent: Sep. 24, 2024

(54) METHOD FOR OPERATING A COMMUNICATION NETWORK, COMMUNICATION NETWORK AND SUBSCRIBER FOR A COMMUNICATION NETWORK

(71) Applicant: Beckhoff Automation GmbH, Verl (DE)

(72) Inventors: Holger Büttner, Berlin (DE); Dirk Janssen, Verl (DE); Erik Vonnahme, Salzkotten (DE); Hans Beckhoff, Verl (DE); Thomas Rettig, Rheda-Wiedenbrück (DE); Thorsten Bunte, Gütersloh (DE); Johannes Beckhoff, Schloß Holte-Stukenbrock (DE); Guido Beckmann, Verl (DE)

(73) Assignee: Beckhoff Automation GmbH, Verl (DE)

( * ) Notice: Subject to any disclaimer, the term of this patent is extended or adjusted under 35 U.S.C. 154(b) by 19 days.

(21) Appl. No.: 17/546,907

(22) Filed: Dec. 9, 2021

(65) Prior Publication Data

US 2022/0103485 A1  Mar. 31, 2022

Related U.S. Application Data

(63) Continuation of application No. PCT/EP2020/076564, filed on Sep. 23, 2020.

(30) Foreign Application Priority Data

Sep. 24, 2019 (DE) .................... 10 2019 125 693.3

(51) Int. Cl.
*H04L 47/33* (2022.01)
*G06F 11/10* (2006.01)
(Continued)

(52) U.S. Cl.
CPC .............. *H04L 47/33* (2013.01); *H04L 45/20* (2013.01); *H04L 47/2416* (2013.01); *G06F 11/1004* (2013.01)

(58) Field of Classification Search
CPC ...... H04L 47/33; H04L 45/20; H04L 47/2416
See application file for complete search history.

(56) References Cited

U.S. PATENT DOCUMENTS 9,130,773 B2   9/2015  Büttner et al.
9,740,655 B2   8/2017  Hartwich
(Continued)

FOREIGN PATENT DOCUMENTS

CN   102598593 A   7/2012
CN   103797467 A   5/2014
(Continued)

OTHER PUBLICATIONS

Office Action dated Jun. 28, 2022 in connection with Chinese Patent Application No. 202080048004.0, 8 pages including English translation.
(Continued)

*Primary Examiner* — Won Tae C Kim
(74) *Attorney, Agent, or Firm* — Dorsey & Whitney LLP

(57) ABSTRACT

A method is described for operating a communication network with a plurality of subscribers. Data exchange between the subscribers takes place in the form of telegrams, which comprise data sections. The subscribers interpret an end portion of the telegrams as a check value for the absence of
(Continued)

errors in preceding data sections. The telegrams are processed in pass-through, so that the telegrams are forwarded to a respective next subscriber while being received. If an error is detected when receiving a telegram, the subscribers send the telegram to the next subscriber with a characterizing data section at the end, so that the telegram has an end portion representing an invalid check value. The telegram is characterized by the characterizing data section, which is part of the end portion, so that the telegram is not to be considered as an initial error but as a subsequent error.

15 Claims, 12 Drawing Sheets

(51) Int. Cl.
*H04L 45/00* (2022.01)
*H04L 47/2416* (2022.01)

(56) References Cited

U.S. PATENT DOCUMENTS

| | | |
|---|---|---|
| 10,454,848 B2 | 10/2019 | Armbruster et al. |
| 2008/0005428 A1* | 1/2008 | Maul ............... G06F 13/426 710/62 |
| 2010/0131686 A1* | 5/2010 | Korrek ............. H04L 12/417 710/105 |
| 2013/0177026 A1 | 7/2013 | Soni et al. |
| 2022/0234865 A1* | 7/2022 | Hosemann ............ B66B 1/28 |

FOREIGN PATENT DOCUMENTS

| | | |
|---|---|---|
| CN | 104995873 A | 10/2015 |
| EP | 2028797 A1 | 2/2009 |
| EP | 2400682 A1 | 12/2011 |
| WO | 2011051157 A1 | 5/2011 |
| WO | 2016110326 A1 | 7/2016 |

OTHER PUBLICATIONS

"EtherCAT" Wikipedia, Dec. 8, 2021, <https://de.wikipedia.org/wiki/EtherCAT>, 9 pages.

"EtherCAT" Wikipedia, Jul. 29, 2020, ‚https://de.wikipedia.org/wiki/EtherCAT>, 17 pages including English translation.

"EtherCAT Slave Controller" Hardware Data Sheet, Beckhoff Automation GmbH, version 2.3, Feb. 21, 2017, 122 pages.

"EtherCAT Slave Controller" Hardware Data Sheet, Beckhoff Automation GmbH, Version 2.2, Jul. 7, 2014, 116 pages.

Examination report dated Jul. 29, 2020 in connection with German patent application No. 10 2019 125 693.3, 18 pages including English translation.

International Preliminary Report on Patentability dated Sep. 24, 2019 in connection with International Patent Application No. PCT/EP2020/076564, 38 pages including English translation.

International Search Report and Written Opinion dated Dec. 21, 2020 in connection with International Patent Application No. PCT/EP2020/076564, 19 pages including English translation.

"EtherCAT—the Ethernet Fieldbus," EtherCAT Technology Group, Nov. 2012, 21 pages.

* cited by examiner

METHOD FOR OPERATING A COMMUNICATION NETWORK, COMMUNICATION NETWORK AND SUBSCRIBER FOR A COMMUNICATION NETWORK

CROSS-REFERENCE TO RELATED APPLICATIONS

This patent application is a continuation of International Patent Application No. PCT/EP2020/076564, METHOD FOR OPERATING A COMMUNICATION NETWORK, COMMUNICATION NETWORK AND SUBSCRIBERS FOR A COMMUNICATION NETWORK, filed 23 Sep. 2020, which claims the priority of German patent application DE 10 2019 125 693.3, VERFAHREN ZUM BETREIBEN EINES KOMMUNIKATIONSNETZWERKS, KOMMUNIKATIONSNETZWERK UND TEILNEHMER FÜR EIN KOMMUNIKATIONSNETZWERK, filed 24 Sep. 2019, each of which is incorporated by reference herein, in the entirety and for all purposes.

FIELD

The present invention relates to a method for operating a communication network comprising a plurality of subscribers. The present invention further relates to a communication network and a subscriber for a communication network.

BACKGROUND

In a communication network with a plurality of subscribers, information may be transmitted between the subscribers in the form of discrete data packets, also referred to as telegrams. The communication network may be realized in the form of an Ethernet-based field-bus system in which the data exchange takes place according to the Ethernet standard. In this context, the telegrams may comprise a plurality of data sections with a data quantity of one byte each.

The telegrams may be processed by the subscribers in passing, i.e. the telegrams are forwarded by the subscribers to another subscriber while they are being received. At the end, the telegrams may comprise an end portion comprising a plurality of data sections and interpreted as a check value by the subscribers. The check value which may refer to previous data sections may be used to check whether the data sections concerned are error-free or contain an error.

In the case of a telegram that is processed by a subscriber in passing, the contents of the telegram may be changed. This makes it necessary to also change the check value of the telegram. For this purpose, the subscriber may calculate both a check value for received data sections and a check value for sent data sections. If the subscriber, when comparing the calculated check value for the received data sections with the check value reproduced by the end portion of the received telegram, detects a difference between the two check values and thus an error, it must not send a valid check value. As a result of the telegrams being processed as they pass, however, part of the end portion reproducing the calculated (valid) check value may already have been sent. In this case, the subscriber may send a manipulated remaining part of the end portion so that an erroneous check value is transmitted to the downstream subscriber. This allows for the following subscriber to recognize that the telegram received by it, which is otherwise correct, is faulty.

In this context, it is further desirable to indicate to the following subscriber that the error has been detected previously. In an Ethernet-based system with a transmission rate of 100 Mbit/s, in which data in 4-bit units are physically transmitted coded as 5-bit units (symbols) (4B5B coding), the subscriber may send another nibble (half byte or four bits) to the next subscriber after sending the check value end portion. In this way, the next subscriber may recognize that the error has already been detected before, and in this respect consider the telegram as a subsequent error. This provides the possibility of localizing the source of the error. In an Ethernet-based system with a transmission rate of 1 Gbit/s, in which data in 8-bit units are physically transmitted coded as 10-bit units (symbols) (8B10B coding), the above procedure is not available due to the transmission technology used.

SUMMARY

The present invention provides an improved method for operating a communication network, an improved communication network and an improved subscriber for a communication network.

According to a first aspect, a method for operating a communication network is proposed. The communication network comprises a plurality of subscribers. Data are exchanged in the communication network between the subscribers in the form of telegrams. The telegrams comprise a plurality of data sections. The subscribers interpret an end portion of the telegrams as check value for checking an absence of errors of preceding data sections of the telegrams. The telegrams are processed by the subscribers in pass-through, so that the telegrams are received by the subscribers and are forwarded to a respective next subscriber while being received. In case an error of a telegram is detected when receiving the telegram, the subscribers perform sending the telegram to a next subscriber with a characterizing data section of the telegram at its end, so that the telegram sent to the next subscriber comprises an end portion representing an invalid check value. The characterizing data section is part of the end portion of the telegram, by which the telegram is characterized for the next subscriber in such a way that the telegram is not to be considered as an initial error but as a subsequent error.

According to a second aspect, a communication network is proposed. The communication network comprises a plurality of subscribers. Data are exchanged in the communication network between the subscribers in the form of telegrams. The telegrams comprise a plurality of data sections. The subscribers are configured to interpret an end portion of the telegrams as check value for checking an absence of errors of preceding data sections of the telegrams. The subscribers are configured to process the telegrams in pass-through, so that the telegrams are received by the subscribers and are forwarded to a respective next subscriber while being received. The subscribers are configured to perform sending a telegram to a next subscriber with a characterizing data section of the telegram at its end, if an error of the telegram is detected when receiving the telegram, so that the telegram sent to the next subscriber comprises an end portion representing an invalid check value. The characterizing data section is part of the end portion of the telegram, by which the telegram is characterized for the next subscriber in such a way that the telegram is not to be considered as an initial error but as a subsequent error.

According to a third aspect, a subscriber for a communication network is proposed. Data are exchanged in the communication network in the form of telegrams. The telegrams comprise a plurality of data sections. The subscriber is configured to interpret an end portion of the telegrams as check value for checking an absence of errors of preceding data sections of the telegrams. The subscriber is configured to process the telegrams in pass-through, so that the telegrams are received by the subscriber and are forwarded to a next subscriber while being received. The subscriber is configured to perform sending a telegram to a next subscriber with a characterizing data section of the telegram at its end, if an error of the telegram is detected when receiving the telegram, so that the telegram sent to the next subscriber comprises an end portion representing an invalid check value. The characterizing data section is part of the end portion of the telegram, by which the telegram is characterized for the next subscriber in such a way that the telegram is not to be considered as an initial error but as a subsequent error.

EXAMPLES

The examples described in the following relate to a method for operating a communication network in which a subscriber transmits a telegram with an intentionally incorrect check value end portion to a next subscriber and the next subscriber is further made aware that the erroneous telegram is not to be regarded as an initial error but as a subsequent error. Further described is a correspondingly configured communication network and a correspondingly configured subscriber for a communication network.

A method for operating a communication network is proposed. The communication network comprises a plurality of subscribers. A data exchange in the communication network between the subscribers takes place in the form of telegrams which comprise a plurality of data sections. The subscribers interpret an end portion of the telegrams as a check value for checking an error-free condition of preceding data sections of the telegrams. The telegrams are processed by the subscribers in passing, so that the telegrams are received by the subscribers and are forwarded to a respective next subscriber during receipt. In the event that an error of a telegram is detected during receipt of the telegram, the subscribers carry out the sending of the telegram in question to a next subscriber with a characterizing data section of the telegram at its end, so that the telegram sent to the next subscriber comprises an end portion which reflects an invalid check value. Which the characterizing data section, which is part of the end portion of the telegram, the telegram is identified for the next subscriber in such a way that the telegram is not to be considered as an initial error, but as a subsequent error.

The method is based on carrying out transmission of a telegram to a next subscriber with a characterizing data section at the end of the telegram in the event of a detected error during receipt of the telegram by a subscriber. This is carried out in such a way that the telegram sent to the next subscriber comprises an end portion which reflects an invalid check value, or in other words an incorrect or error indicating check value for data sections of the telegram previously sent to the next subscriber. Furthermore, the characterizing data section marks the telegram for the next subscriber to the effect that the error has already been previously detected, and in this respect the telegram is to be considered by the next subscriber not as an initial error, but as a subsequent error instead. Based on this, the source of the error may be localized, i.e. at which subscriber the error occurred first.

Sending a telegram with such a characterizing data section of the telegram at its end offers the possibility of realizing the identification of the telegram as a subsequent error with a high reliability. In addition, the proposed procedure may be used universally and is suitable for a large number of different embodiments of communication networks or field-bus systems in which telegrams are processed in passing.

In the following, further possible details and embodiments are described in more detail, which may be considered for the method.

It may be provided that the subscribers determine a valid check value for received telegrams or data sections of received telegrams. By comparing the determined check value with the check value of the received telegram reproduced by the end portion, an error (check value error) may be detected, provided that there is a difference. Other possible errors are described in more detail below. Furthermore, the subscribers may determine a valid check value for sent telegrams or data sections of sent telegrams. This may be considered in connection with selecting or setting the characterizing data section, as will also be described in more detail below.

The data sections of the telegrams, including a characterizing data section used to identify a telegram, may each comprise the same amount of data. For example, the data sections may each comprise one byte or eight bits.

This is e.g. the case in a possible embodiment in which the communication network is an Ethernet-based field-bus system. This may be a system with a transmission rate of e.g. 1 Gbit/s.

Another possible embodiment is, for example, an EtherCAT field-bus system.

The end portion of the telegrams interpreted by the subscribers as a check value may comprise a plurality of data sections. For example, four data sections are possible.

In the case of a telegram which is sent from one subscriber to the next subscriber with a characterizing data section, the characterizing data section is part of the end portion of the telegram interpreted as a check value. The characterizing data section may be located at the end of the check value end portion and may be the last data section of the end portion.

With reference to the above-mentioned embodiments, the check value end portion may comprise four data sections and thus four bytes. If a telegram with a characterizing data section is sent to a next subscriber, the characterizing data section may be the last or fourth data section of the check value end portion.

With regard to a characterizing data section used in the method, this data section is provided or set by a subscriber in such a way that the next subscriber receiving the associated telegram may recognize the identification associated therewith and consequently take the telegram into account as a subsequent error. The following embodiments may be considered in this context.

In one possible embodiment, the subscribers select the characterizing data section from a group comprising a plurality of different predetermined data sections. In this way, the characterizing of a telegram sent from one subscriber to a next subscriber may be realized in a simple and reliable way. The predetermined data sections may be stored in the subscribers. If a subscriber receives a telegram with an end portion that represents an invalid check value and the telegram also comprises one of the predetermined data sections as the characterizing data section, the subscriber in question may recognize the characterizing of the telegram achieved in this way and consequently take the telegram into account as a subsequent error.

The aforementioned group may e.g. comprise two different predetermined data sections, hereinafter referred to as first and second predetermined data sections. The first and second predetermined data sections may e.g. be data sections that are inverted with respect to each other.

In a further embodiment, a check is carried out for the selection by the subscribers as to whether, when the first predetermined data section is sent, there is a valid calculated check value, or in other words a correct or error-free calculated check value for previously sent data sections. If this is not the case and an invalid calculated check value is present, the first predetermined data section is selected by the subscribers as the characterizing data section. If, on the other hand, it is determined that a valid calculated check value indicating no errors is present when the first predetermined data section is sent, the second predetermined data section is selected by the subscribers as the characterizing data section. In this way, it may be ensured that a telegram sent to a next subscriber comprises an end portion which reflects an invalid check value.

In a further embodiment, a check is carried out for the selection by the subscribers as to whether an invalid and thus error-indicating calculated check value is present for previously sent data sections when sending the first predetermined data section and when sending the second predetermined data section, respectively. In the case or if it is determined that a valid calculated check value indicating freedom from error is present for one of the first and second predetermined data sections, the other of the first and second predetermined data sections is selected as the characterizing data section by the subscribers. In the case deviating from this in which in each case an invalid calculated check value is present, that one of the first and the second predetermined data section is selected as the characterizing data section by the subscribers by which a greater difference may be achieved to a valid and error-free calculated check value for previously transmitted data sections. In this way, it may also be achieved that a telegram sent to a next subscriber comprises an end portion which reflects an invalid check value. In addition, it may be achieved that the invalid check value reproduced by the end portion differs as much as possible from a valid check value. This makes it possible with a high degree of reliability to avoid that, when a characterized telegram is sent to a next subscriber and a (further) error occurs, the next subscriber receives a telegram with an end portion that indicates the presence of a valid check value.

In a further embodiment, the subscribers set the characterizing data section by performing a predetermined calculation using at least one previously sent data section, i.e. at least one data section of the associated telegram previously sent to a next subscriber. This procedure also provides the possibility of characterizing a telegram with a high reliability. A characterizing data section provided in accordance with the above procedure is in this context linked to at least one data section previously sent to a next subscriber in a manner that may be recognized by the next subscriber. This is because the subscribers are each configured to perform the same calculation steps. Provided that a subscriber receives a telegram with an end portion which represents an invalid check value indicating an error, and provided that the telegram also comprises a characterizing data section which is generated on the basis of the predetermined calculation and is thereby linked in a recognizable manner to at least one previously transmitted data section, the subscriber in question may recognize the identification of the received telegram achieved in this way by performing an analogous calculation using at least one received data section and consequently consider the telegram as a subsequent error.

In a further embodiment, carrying out the predetermined calculation comprises determining a valid check value, and thus a check value indicating freedom from errors, for previously transmitted data sections and forming an alternative value by applying a predetermined calculation algorithm to a partial value of the determined valid check value at its end. In order to determine the valid check value, a fictitious error-free telegram may be considered or calculated, the transmission of which would result in the valid check value being present, and the transmission of which would thus indicate to the next subscriber by the check value that no error has occurred. The formed alternative value is set here as the characterizing data section. As indicated above, the check value end portion of a telegram may comprise a plurality of data sections. In a corresponding manner, the check value may comprise a plurality of partial values. Here, an alternative value is calculated for the partial value located at the end of the fictitious valid check value by a predetermined calculation algorithm. This alternative value is used as the characterizing data section. As a result, the telegram transmitted to a next subscriber is characterized in a recognizable manner for the next subscriber which may thus regard it as a subsequent error.

In a further embodiment, the calculation algorithm is an inversion. Deviating from this, other arbitrary calculation algorithms may also be used.

The above-mentioned localization of one (or a plurality of) error source(s) may be reliably realized on the basis of non-characterized telegrams and thus telegrams to be considered as initial errors and, as the case may be, additionally on the basis of characterized telegrams and thus telegrams to be considered as subsequent errors. With regard to the subscribers of the communication network, it may be provided in this context that the subscribers comprise corresponding counters.

In this respect, a further embodiment provides that the subscribers comprise an error counter relating to an initial error. In the event that the subscribers detect an error when receiving a telegram and the telegram does not comprise a characterizing data section at its end, the subscribers' error counter relating to the initial error is incremented. In this embodiment, one or a plurality of error locations in the communication network may be located by evaluating the subscribers' initial-error counters.

In a further embodiment, it is provided that the subscribers further determine an error type of the detected error or initial error, and an error counter of the subscribers relating to the error type is incremented. This embodiment may be used if different error types may occur during data transmission when operating the communication network. Examples of this are described in more detail below. In this context, the subscribers may each comprise a corresponding error counter for the different error types, and after determining an error type, increment the associated error counter. By evaluating the error-type-error counters of the subscribers, e.g. statistical statements may be made about different errors that have occurred in the communication network.

In a further embodiment, the subscribers comprise an error counter relating to a subsequent error. In the event that the subscribers detect an error when receiving a telegram and the telegram comprises a characterizing data section at its end, the subscribers' error counter relating to the subsequent error is incremented. In this context, one or more error locations in the communication network may be located by evaluating the initial-error counters and the subsequent-error counters of the subscribers.

As indicated above, different types of data exchange errors may occur when operating of the communication network.

It is e.g. possible that data units in the form of coded data units or symbols are physically transmitted during data transmission, as is e.g. the case in Ethernet-based systems. In this case, a fault may lead to an unassigned or invalid symbol being received when a telegram is received. This error case is also referred to as symbol error.

The telegrams may also contain length information, i.e. information on the number of data sections of a telegram. Due to a fault, a subscriber may receive a larger or smaller number of data sections deviating from the length information when receiving a telegram. This error case is also referred to as length error.

Provided that the telegrams comprise length information, an error may further consist in a subscriber receiving a number of data sections corresponding to the length information when receiving a telegram, but the end portion of the received telegram reproducing an invalid check value and thus indicating an error. In this case, the check value referring to preceding data sections of the telegram and reproduced by the received end portion may deviate from an expected check value determined on the basis of the preceding data sections. This error case is also referred to as check value error.

It is also possible to have a configuration in which the telegrams do not contain any length information. Here, too, the end portion of the telegrams is interpreted by the subscribers as a check value. When a telegram is received, the end portion of the received telegram may reflect an invalid check value indicating an error, so that a check value error has occurred.

The proposed method and its embodiments may be applied with respect to all of the aforementioned types of errors. Provided that one of the above-mentioned errors is detected when a telegram is received by a subscriber, the telegram is forwarded in the above-mentioned manner, i.e. with a characterizing data section at its end. In case the faulty telegram received by the subscriber is not characterized, the telegram is considered as an initial error. For this purpose, an initial-error counter of the subscriber and, as the case may be, a further error counter referring to the error type may be incremented. If the telegram received by the subscriber is marked with a characterizing data section at its end, the telegram is considered as a subsequent error. For this purpose, a subsequent-error counter of the subscriber may be incremented.

In a further embodiment, it is provided that if an error is detected when receiving a telegram, the subscribers, depending on an error type of the detected error, prematurely terminate the transmission of the telegram to a next subscriber by transmitting the characterizing data section. This embodiment may e.g. be considered if a symbol error or a length error in the form of a telegram with a number of data sections deviating from a length information is detected by a subscriber. Due to the premature termination, the telegram sent to the next subscriber may (also) have a length error. In this embodiment, it is possible that the presence of an end portion representing an invalid check value of the telegram sent to the next subscriber is a consequence of the premature termination of the telegram by sending the characterizing data section.

In a further embodiment, the communication network comprises a master-slave structure. Here, the aforementioned subscribers of the communication network are configured as slaves, and the communication network comprises a further active subscriber configured as a master. The master subscriber and the slave subscribers may be connected via a transmission path such as a data line. The master subscriber has network-access authorization and may output telegrams to the transmission path and receive telegrams via the transmission path. In contrast to this, the slave subscribers do not have their own network-access authorization to the communication network and are therefore not allowed to output independent telegrams to the communication network, but only to exchange data with the telegrams circulating on the transmission path.

In a further embodiment, a CRC check value is used as the check value. This is a check value calculated according to the CRC method (Cyclic Redundancy Check) from preceding data sections of a telegram. The CRC method is based on polynomial division using a generator polynomial.

A communication network is proposed. The communication network may be configured to perform the aforementioned method or a method according to one or a plurality of the aforementioned embodiments. The communication network comprises a plurality of subscribers. A data exchange in the communication network between the subscribers takes place in the form of telegrams, which comprise a plurality of data sections. The subscribers are configured to interpret an end portion of the telegrams as a check value for checking whether preceding data sections of the telegrams are free of errors. The subscribers are further configured to process the telegrams on the fly, so that the telegrams are received by the subscribers and are forwarded to a respective next subscriber while being received. The subscribers are further configured to perform the sending of a telegram to a next subscriber with a characterizing data section of the telegram at its end, provided that an error of the telegram is detected while receiving the telegram, so that the telegram sent to the next subscriber comprises an end portion which reflects an invalid check value. With the characterizing data section, which is part of the end portion of the telegram, the telegram is identified for the next subscriber in such a way that the telegram is not to be considered as an initial error but as a subsequent error.

For the aforementioned communication network, the same features and embodiments may be applied and the same advantages may be considered as described above with reference to the method.

For example, the subscribers may be configured to select the characterizing data section from a group comprising a plurality of predetermined data sections. Furthermore, the subscribers may be configured to set the characterizing data section by performing a predetermined calculation using at least one previously transmitted data section. Also, the subscribers may comprise at least one error counter. This includes an initial-error counter, a subsequent-error counter, as well as a plurality of error counters relating to different types of errors. The subscribers may further be configured to prematurely terminate the transmission of the telegram to a next subscriber depending on an error type of a detected error by transmitting the characterizing data section. Furthermore, the communication network may comprise a master-slave structure. Also, the communication network may be an Ethernet-based field-bus system, e.g. an EtherCAT field-bus system. A CRC check value may be used as a check value.

A subscriber for a communication network is proposed. This may be the aforementioned communication network. A data exchange in the communication network takes place in the form of telegrams comprising a plurality of data sections. The subscriber is configured to interpret an end portion of the telegrams as a check value for checking whether preceding data sections of the telegrams are free of errors. The subscriber is further configured to process the telegrams on the fly, so that the telegrams are received by the subscriber and are forwarded to a respective next subscriber while being received. The subscriber is further configured to perform the sending of a telegram to a next subscriber with a characterizing data section of the telegram at its end, provided that an error of the telegram is detected while receiving the telegram, so that the telegram sent to the next subscriber comprises an end portion which reflects an invalid check value. With the characterizing data section, which is part of the end portion of the telegram, the telegram is identified for the next subscriber in such a way that the telegram is not to be considered as an initial error but as a subsequent error.

In a corresponding manner, the same features and embodiments may be conceivable for the aforementioned subscriber, and the same advantages may be contemplated as described above.

The embodiments described above may be used individually or in any combination with one another.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Based on the following schematic figures, embodiments of a method for operating a communication network as well as embodiments of a communication network are described. The method and the communication network are configured in such a way that when a communication subscriber receives an erroneous telegram, the telegram is forwarded to a next subscriber with a characterization, and the next subscriber may recognize from the characterizing that an error in the telegram is to be regarded as a subsequent error.

Figure 1:
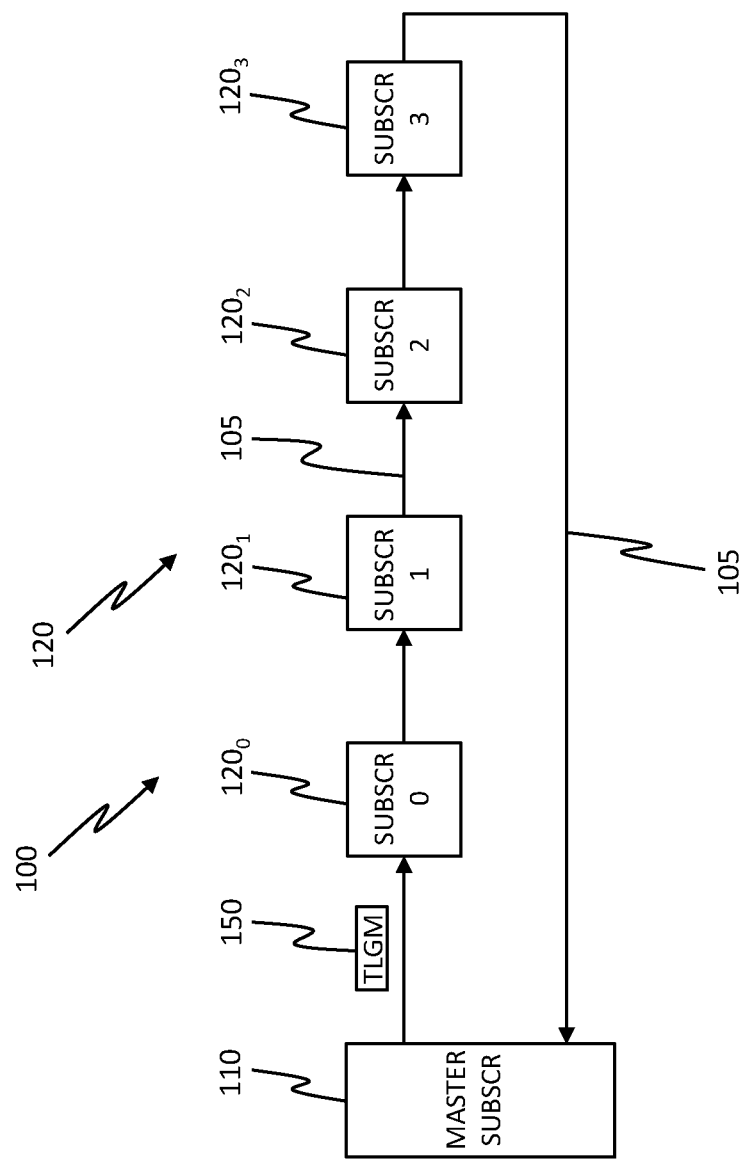
FIG. 1 shows a communication network comprising a master-slave structure.

For further illustration, FIG. 1 shows a schematic depiction of a communication network 100 in which the method may be applied. The communication network 100 comprises a master-slave structure and comprises a master subscriber 110 and a plurality of slave subscribers 120. The master subscriber 110 and the slave subscribers 120 are interconnected via a transmission path 105. Via the transmission path 105 which is implemented in the form of a data line, data may be exchanged in the communication network 100 in the form of telegrams 150.

The communication network 100 exemplarily shown in FIG. 1 comprises four slave subscribers 120, which are further provided with the subscripts 0, 1, 2, 3 for differentiation. The slave subscribers 120 may e.g. be sensors, actuators, display devices, operating devices, motors, etc. Deviating from the exemplary embodiment in FIG. 1, the communication network 100 may also comprise a different or larger number of slave subscribers 120.

The master subscriber 110 represents the active subscriber of the communication network 100, which may determine the data traffic. For this purpose, only the master subscriber 110 has access authorization to the communication network 100 and may output telegrams 150 to the transmission path 105 and receive them via the transmission path 105.

In contrast, the slave subscribers 120 do not have their own network access authorization, and are therefore not allowed to output independent telegrams 150 to the transmission path 105. Instead, the slave subscribers 120 may only exchange data with the telegrams 150 passing through the transmission path 105.

In the communication network 100 shown in FIG. 1, the slave subscribers 120 and the master subscriber 110 are connected as a chain or ring. In the following, the slave subscribers 120 are also referred to as first slave subscriber $120_0$, second slave subscriber $120_1$, third slave subscriber $120_2$ and last slave subscriber $120_3$ according to their order in the direction of transmission downstream of the master subscriber 110.

Data transmission in the form of telegrams 150 takes place in one direction, starting from the master subscriber 110 to the first slave subscriber $120_0$ and from there in each case from one to the next slave subscriber 120 to the last slave subscriber $120_3$, and from there back to the master subscriber 110. In the individual slave subscribers 120, the telegrams 150 are processed in pass-through. Here, the telegrams 150 are received by the subscribers 120 and, while being received, forwarded, with a throughput delay, to a respective next subscriber 120, or, in the case of the last slave subscriber $120_3$, to the master subscriber 110. When processing the telegrams 150 in pass-through, the telegrams 150 may be forwarded by the slave subscribers 120 without changing the data content or with changed data content.

Furthermore, it is possible that the telegrams 150, deviating from the depiction in FIG. 1, are sent back from the last slave subscriber $120_3$ via the other slave subscribers 120 (in the order third slave subscriber $120_2$, second slave subscriber $120_1$, first slave subscriber $120_0$) to the master subscriber 110 without further processing.

The communication network of FIG. 1 may be an Ethernet-based field-bus system in which the data exchange takes place via the telegrams 150 according to the Ethernet standard. This may be a system with a transmission rate of 1 Gbit/s. In this context, an embodiment of the network 100 in the form of an EtherCAT field-bus system may also be considered. With reference to such embodiments, the data are physically transmitted on the transmission path 105 as coded data or symbols. At a transmission rate of 1 Gbit/s an, 8B/10B coding is present, i.e. 8-bit data units coded as 10-bit data units are transmitted. Thus, encoding and decoding takes place when sending and receiving telegrams 150 during data transmission.

Figure 2:
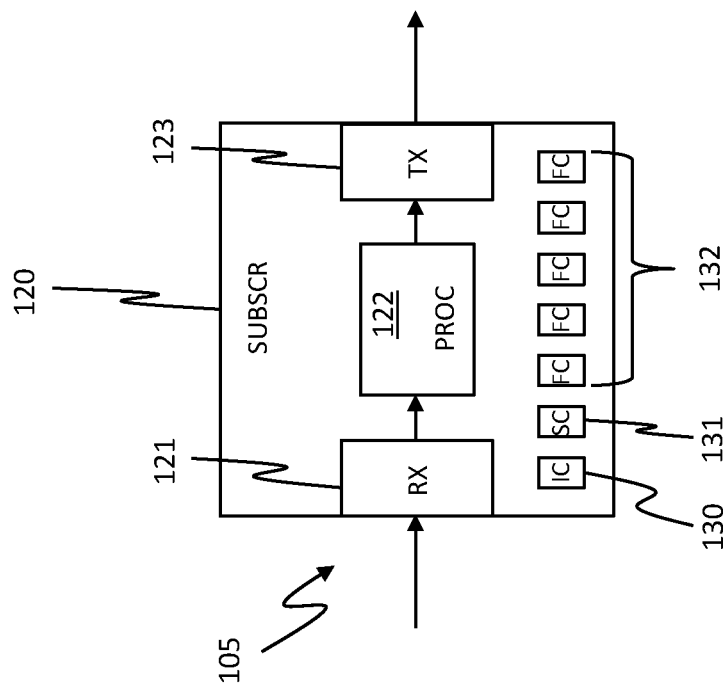
FIG. 2 shows a slave subscriber.

For this purpose, the slave subscribers 120 comprise a receiving device 121 and a transmitting device 123, as shown in FIG. 2 with reference to a slave subscriber 120, wherein the telegrams 150 are received and decoded by the receiving device 121, and encoded and transmitted by the transmitting device 123. A further component of the slave subscribers 120 is a processing device 122 located between the receiving and transmitting devices 121, 123, by which the telegrams 150 may be processed and the data content of the telegrams 150 may be changed if applicable. The slave subscribers 120 may further comprise other components, such as a data memory. The master subscriber 110, by which the output of the telegrams 150 onto the transmission link 105 is controlled and initiated as indicated above, also comprises a transmitting device for encoding and transmitting the telegrams 150 and a receiving device for receiving and decoding the telegrams 150, as well as further components such as, for example, a central control unit and a memory.

When transmitting data in the communication network 100, interferences may occur. In this way, a telegram 150 received by a slave subscriber 120 may comprise an error. In such a case, it is provided that the slave subscriber 120 forwards the faulty telegram 150 with a flag, whereby an error in the telegram 150 may be taken into account by a next slave subscriber 120 as a subsequent error. In this way, it is possible to locate the source of the error, i.e. at which of the slave subscribers 120 the error occurred or arose first. For this purpose, as is shown in FIG. 2, as well, the slave subscribers 120 comprise an initial-error counter 130 and a subsequent-error counter 131. If a slave subscriber 120 receives a faulty telegram 150 and this telegram is not marked, the initial-error counter 130 is incremented. In case of receiving a faulty telegram 150, which is flagged, the subsequent-error counter 131 is incremented. By evaluating the error counters 130, 131 of the slave subscribers 120, it is consequently possible to locate the source of the error or even a plurality of error sources.

In FIG. 2, it is indicated that the slave subscribers 120 may comprise further error counters 132. In this way, different types of error may also be taken into account. The error counters 132 are each assigned to one type of error. In this context, it is provided that the slave subscribers 120, when detecting an initial error of a received telegram 150, further determine the present error type, and based thereon the associated error counter 132 is incremented. In this way, e.g. statistical statements may be made about different errors that have occurred in the communication network 100.

Aforementioned steps such as determining errors and characterizing a telegram 150 as a subsequent error, as well as other steps as described in more detail below with reference to FIGS. 3 to 12, may be performed using the processing device 122 of the slave subscribers 120. In a corresponding manner, the processing device 122 may initiate the incrementing of the error counters 130, 131, 132. Evaluation of the error counters 130, 131, 132 may be performed by the master subscriber 110, to which the error counter information may be transmitted by one or more telegrams 150.

FIGS. 3 to 12 show diagrams illustrating the processing of telegrams 150 in passing by slave subscribers 120 of the communication network 100 of FIG. 1 for different errors. In each case, the error occurs first when a telegram 150 is received by a slave subscriber 120 which forwards the telegram 150 to a next slave subscriber 120. For the following description, it is considered that it is the second slave subscriber $120_1$, where the error first occurs, and that the third slave subscriber $120_2$ is the next subscriber. In this respect, in the diagrams RX 1 and TX 1 denote a first receipt and a first transmission of the telegram 150 by the second slave subscriber $120_1$, and RX 2 and TX 2 denote a second receipt and a second transmission of the telegram 150 by the subsequent third slave subscriber $120_2$. In a part of the diagrams (FIGS. 4, 6, 8, 10 and 12), TX-CRC further denotes a first calculation of a (fictitious) valid check value of data of the telegram 150 transmitted by the second slave subscriber $120_1$, and RX-CRC denotes a second calculation of a (fictitious) valid check value of data of the telegram 150 received by the third slave subscriber $120_2$.

The telegrams 150, as shown in FIGS. 3 to 12, comprise a plurality of data sections 155. Each data section 155 comprises the same amount of data, which in the case of Ethernet is one byte or eight bits. For differentiation purposes, the data sections 155 are additionally provided with designations such as D_0, D_n, D0, D1, etc. Depending on the respective designation, the data sections 155 are also referred to as zeroth data section D0, first data section D1, second data section D2, third data section D3, fourth data section D4 and fifth data section D5. Before the zeroth to fifth data sections D0, D1, D2, D3, D4, D5 in the telegram 150 mentioned in the last sentence, there are preceding data sections D_0 to D_n, which are also referred to as further zeroth data section D_0 to further nth data section D_n.

In this connection, it is noted that the data contents of the data sections 155 characterized with the same designations may differ from each other, since the slave subscribers 120 may process the telegrams 150 as indicated above. In this way, e.g. differing data may be present for the data sections 155 indicated with the same designations between the telegrams 150 illustrated at the first receiving RX 1 and first transmitting TX 1 (and also at the second receiving RX 2 and second transmitting TX 2).

The above-mentioned characterizing of a telegram 150 is carried out by a characterizing data section 160 of the telegram 150 at its end. The characterizing data section 160 comprises the same amount of data as the other data sections 155, i.e. one byte in the case of Ethernet.

The telegrams 150 also comprise a SOF (Start of Frame) field 151 at the beginning and an EOF (End of Frame) field 152 at the end, which may be used to indicate to a slave subscriber 120 the beginning as well as the end of a telegram 150 when it is received. The two fields 151, 152 may be specific transmitted symbols or signals. The actual user data in the form of the data sections 155, 160 are located between the two fields 151, 152.

With reference to FIGS. 3 to 12, it is additionally pointed out that the processing of the telegrams 150 by the slave subscribers 120 takes place in each case from left to right, i.e. from receipt of the SOF field 151 to the EOF field 152. Furthermore, FIGS. 3 to 12 show the throughput delay present in the processing of the telegrams 150 in passing, which in this case corresponds to the length of a data section 155 or one byte. Thus, the telegram 150 received by the second slave subscriber $120_1$ is forwarded to the third slave subscriber $120_2$ with an offset of one data section 155 or one byte.

The slave subscribers 120 are further configured in such a way that an end portion 157 of the telegrams 150 located before the EOF field 152 is interpreted as a check value, which may be used to check whether previous data sections 155 of the telegrams 150, i.e. located before the end portion 157, are free of errors. In the present case, the end portion 157 comprises four data sections 155 or four bytes. In case of a characterizing, the characterizing data section 160 is part of the end portion 157 and is located at its end, so that the end portion comprises three data sections 155 and then the characterizing data section 160.

The check value represented by the end portion 157 may be used to check whether preceding data sections 155 of the telegrams 150, i.e. those located before the end portion 157, are free of errors. The check value may be calculated according to a predetermined calculation procedure from the preceding data sections 155, and is thereby associated with these data sections 155 in a predetermined manner. The check value may be a CRC check value which may be calculated according to the cyclic redundancy check (CRC) procedure from the preceding data sections 155. Provided that there is no error case and a telegram 150 is correctly received by a slave subscriber 120, a valid check value is present, which indicates that the data sections 155 located before the end portion 157 are free of errors.

Figure 3:
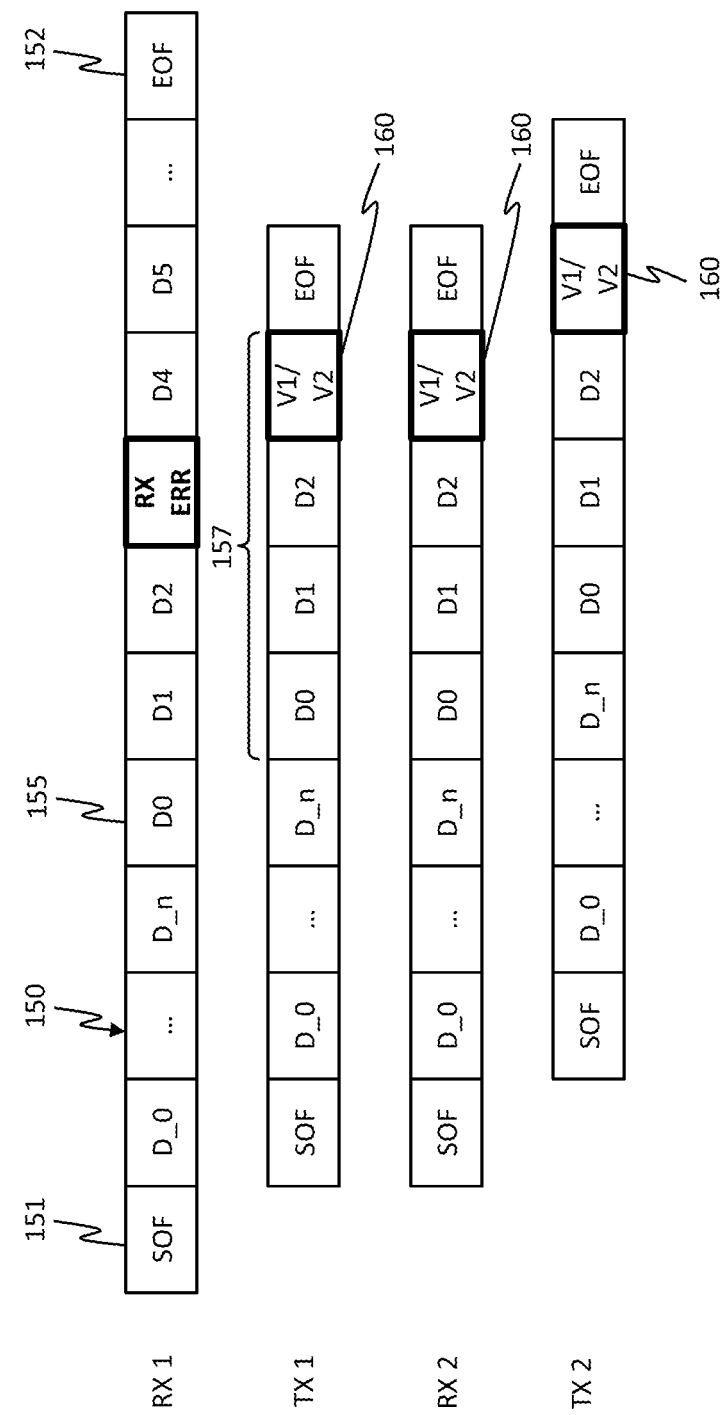
FIG. 3 is a diagram illustrating the processing of telegrams on the fly by slave subscribers in the event of errors, illustrating the presence of a symbol error.

As indicated above, various errors may occur during data transmission in the communication network 100 due to interference. The diagram of FIG. 3 illustrates a presence of a symbol error. In this error case, a received telegram 150 contains an unassigned and thus invalid symbol. FIG. 3 illustrates as an example that the telegram 150 received by the second slave subscriber $120_1$ does not comprise a correct third data section D3 after the second data section D2, but instead comprises an erroneous data section RX ERR. In this case or after a detection of the symbol error by the second slave subscriber $120_1$, the offset forwarding of the telegram 150 to the next or third slave subscriber $120_2$ is prematurely terminated by the second slave subscriber $120_1$ transmitting a characterizing data section 160 after the second data section D2 and subsequently terminating the transmission of the telegram 150 by transmitting the EOF field 152. Furthermore, an incrementing of the initial-error counter 130 of the second slave subscriber $120_1$ takes place. If present, an incrementing of a further error counter 132 of the second slave subscriber $120_1$ relating to a symbol error may also take place (cf. FIG. 2).

In the method variant shown in FIG. 3, it is provided with respect to the characterizing data section 160 that this data section 160 is selected from a first predetermined data section V1 and a second predetermined data section V2. The respective first and second predetermined data sections V1, V2 are hereby stored in all slave subscribers 120 of the communication network 100, whereupon the slave subscribers 120 may recognize the characterizing. The predetermined data sections V1, V2 may be inverted data sections (e.g. having values 0xA4 and 0x5B). The selection of one of the two predetermined data sections V1, V2 may be provided to ensure that the telegram 150 sent to the next or third slave subscriber $120_2$ comprises an end portion 157 that does not reflect a valid but instead an invalid check value.

The telegram 150 sent by the second slave subscriber $120_1$ to the next or third slave subscriber $120_2$ and received by the latter in the present case comprises an end portion 157 including the zeroth, first and second data section D0, D1, D2 and the characterizing data section 160 (cf. the first transmission TX 1 and the second receipt RX 2). The check value represented by the end portion 157 refers to the preceding data sections, i.e. the further zeroth data section D_0 to further nth data section D_n. To ensure that the end portion 157 does not convey a valid check value, the second slave subscriber $120_1$ may proceed as follows.

It is e.g. possible that the second slave subscriber $120_1$ checks, by performing a corresponding calculation, whether a valid check value represented by the end portion 157 would be present for the preceding further zeroth to nth data sections D0 to D_n if the telegram 150 with the first predetermined data section V1 were transmitted. If this is not the case, the second slave subscriber $120_1$ transmits the first predetermined data section V1 after the second data section D2. If, on the other hand, the second slave subscriber $120_1$ determines that by transmitting the telegram 150 with the first predetermined data section V1, the end portion 157 would represent a valid check value, the second predetermined data section V2 is selected by the second slave subscriber $120_1$ and transmitted after the second data section D2.

In this way, the telegram 150 transmitted to the next or third slave subscriber $120_2$ comprises an end portion 157 representing an invalid check value comprising the zeroth, first and second data sections D0, D1, D2 and the characterizing data section 160, so that the telegram 150 may be recognized as erroneous by the third slave subscriber $120_2$. It is further possible that the telegram 150 shortened by the premature termination of transmission is additionally recognized as erroneous by the third slave subscriber $120_2$ due to the shorter telegram length. Furthermore, the telegram 150 is identified by the characterizing data section 160, i.e. the first predetermined data section V1 or the second predetermined data section V2, in a recognizable manner for the third slave subscriber $120_2$, so that the error in the telegram 150 is taken into account by the latter as a subsequent error. For this purpose, the subsequent-error counter 131 of the third slave subscriber $120_2$ is incremented (cf. FIG. 2).

Another variant with reference to the selection is that the second slave subscriber $120_1$ checks, by performing a corresponding calculation, whether, when the telegram 150 is transmitted with each of the predetermined first and second data sections V1 and V2, respectively, an invalid check value represented by the end portion 157 would occur for the preceding data sections, i.e. the further zeroth to nth data sections D_0 to D_n. Within the framework of the check, the second slave subscriber $120_1$ may further calculate a valid check value for the transmitted further zeroth to nth data sections D_0 to D_n. Provided that the valid check value is determined to be transmitted by the end portion 157 when transmitted with one of the two predetermined data sections V1, V2, the other of the two predetermined data sections V1, V2 is selected by the second slave subscriber $120_1$ and transmitted after the second data section D2.

However, if it is determined that an invalid check value would be transmitted by the end portion 157 if each of the two predetermined data sections V1, V2 were to be transmitted, that one of the predetermined data sections V1, V2 is selected and transmitted by the second slave subscriber $120_1$ by which a greater difference from the valid check value for the previously transmitted further zeroth to nth data sections D_0 to D_n may be obtained. This may also achieve that the telegram sent to the third slave subscriber $120_2$ comprises an end portion 157 reflecting an invalid check value. In addition, the check value may differ as much as possible from the valid check value. In this way, it may be avoided that, when sending the characterized telegram 150 to the third slave subscriber $120_2$ and an error occurring in the process, as the case may be, the telegram 150 is received by the third subscriber $120_2$ with an end portion 157 which conveys the presence of a valid check value.

FIG. 3 further shows that the third slave subscriber $120_2$ also forwards the faulty telegram 150 to the next slave subscriber 120 (in this case the last slave subscriber $120_3$, cf. FIG. 1) in a flagged form with a characterizing data section 160 at its end (cf. second transmission TX 2). In this context, the third slave subscriber $120_2$ performs the same steps as the second slave subscriber $120_1$. The third slave subscriber $120_2$ does not detect a symbol error, but instead a check value error and, as the case may be, an additional error in the form of a telegram 150 that is too short, as will be described below. However, the characterizing of the telegram 150 forwarded to the last slave subscriber $120_3$ is carried out according to the above description in that the characterizing data section 160 is selected from one of the predetermined first or second data sections V1, V2 and is sent after the second data section D2.

Figure 4:
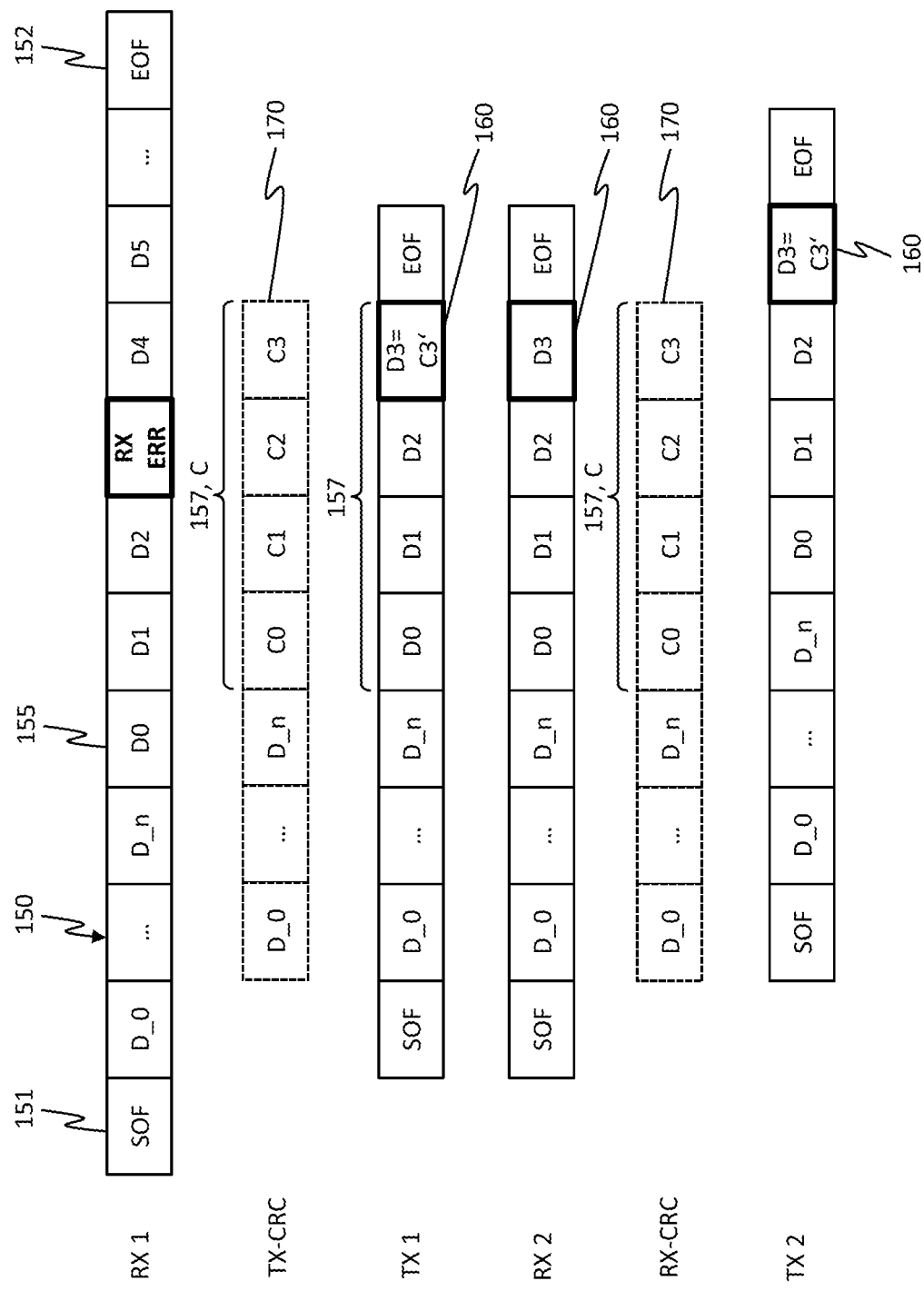
FIG. 4 is a diagram showing a process variant which may be carried out in the event of a symbol error.

The diagram of FIG. 4 shows a further process variant which may be carried out in the event of a symbol error. Here, too, the second slave subscriber $120_1$, after recognizing the received faulty data section RX ERR, prematurely terminates forwarding of the telegram 150 to the next or third subscriber $120_2$ by the second slave subscriber $120_1$ transmitting a characterizing data section 160 after the transmission of the second data section D2 and then terminating the transmission of the telegram 150 by transmitting the EOF field 152 (cf. first transmission TX 1). In a corresponding manner, an incrementing of the initial-error counter 130 and, as the case may be, of a further error counter 132 of the second slave subscriber $120_1$ relating to a symbol error takes place. With respect to the characterizing data section 160, it is provided to define this by performing a predetermined calculation. In this context, all of the slave subscribers 120 of the communication network 100 are configured to perform the predetermined calculation described below, whereupon the slave subscribers 120 may detect the characterizing.

As shown in FIG. 4 on the basis of the row representing a first calculation TX-CRC, the second slave subscriber $120_1$ calculates a fictitious valid check value C, in this case comprising the zeroth partial value C0, the first partial value C1, the second partial value C2 and the third partial value C3 for further zeroth to nth data sections D_0 to D_n previously sent to the next or third slave subscriber $120_2$. In this process, the second slave subscriber $120_1$ provides a transmission of a fictitious correct telegram 170 as a basis, wherein an end portion 157 present after the further zeroth to nth data sections D_0 to D_n would reflect the valid check value C, and thus indicate to the third slave subscriber $120_2$ that there is no error with respect to the check value. In order to characterize the telegram 150 actually sent to the next or third slave subscriber $120_2$, the second slave subscriber $120_1$ determines a third alternative value C3' for the last valid third partial value C3 of the fictitious valid check value C. This is done by applying a predetermined calculation algorithm to the third partial value C3. It is e.g. possible to invert the third partial value C3. Alternatively, another calculation algorithm may be used. The third alternative value C3' determined in this way is set as the characterizing data section 160. Furthermore, the characterizing data section 160 or the third data section D3, which herein corresponds to the third alternative value C3', is sent to the third slave subscriber $120_2$ after the second data section D2.

The telegram 150 sent to the next or third slave subscriber $120_2$ comprises an end portion 157 representing an invalid check value comprising the zeroth data section D0, the first data section D1, the second data section D2 and the characterizing data section 160, so that the telegram 150 may be recognized as erroneous by the third slave subscriber $120_2$. It is further possible that the telegram 150, which is shortened due to the premature termination of the transmission, is additionally recognized as erroneous by the third slave subscriber $120_2$ due to the shorter telegram length. Moreover, the telegram 150 is identified as a subsequent error for the third slave subscriber $120_2$ by the characterizing data section 160 or by the third data section D3, which here corresponds to the third alternative value C3', in a manner recognizable for the subscriber $120_2$.

For this purpose, the third slave subscriber $120_2$ performs the same calculation as previously performed by the second slave subscriber $120_1$ (cf. second check value calculation RX-CRC), i.e. the third slave subscriber $120_2$ calculates a fictitious valid check value C with the zeroth, first, second and third partial values C0, C1, C2, C3 for the further zeroth to nth data sections D_0 to D_n received by the third slave subscriber $120_2$. Here, the third slave subscriber $120_2$ provides a receipt of a fictitious correct telegram 170 as a basis, wherein an end portion 157 present after the further zeroth to nth data sections D_0 to D_n would reflect the valid check value C. Furthermore, the third slave subscriber $120_2$ determines a third alternative value C3' for the last valid third partial value C3 by applying the predetermined calculation algorithm (e.g. inverting) to the third partial value C3. Provided that the third alternative value C3' calculated by the third slave subscriber $120_2$ corresponds to the received third alternative value C3', and the third slave subscriber $120_2$ may consequently detect the characterizing, the error of the received telegram 150 may be taken into account by the third subscriber $120_2$ as a subsequent error. For this purpose, the subsequent-error counter 131 of the third slave subscriber $120_2$ is incremented.

FIG. 4 further shows that the third slave subscriber $120_2$ also forwards the faulty telegram 150 with a characterizing data section 160 at its end to the next slave subscriber 120 (last slave subscriber $120_3$, cf. FIG. 1) (cf. second transmission TX 2). The third slave subscriber $120_2$ performs the same steps as the second slave subscriber $120_1$. The third slave subscriber $120_2$ does not detect a symbol error, but instead a check value error and, as the case may be, an additional error in the form of a telegram 150 that is too short. However, the characterization of the forwarded telegram 150 is also carried out in that the characterizing data section 160 is set according to the above description by carrying out the predetermined calculation and is transmitted after the second data section D2.

In the following, further process variants are described which may be considered with respect to further possible types of error. In these variants, the procedure is analogous to the diagrams described with reference to FIGS. 3 and 4, i.e. a characterizing data section 160 used for characterizing a telegram 150 at its end is selected from one of two predetermined data sections, i.e. a first or second predetermined data section V1 or V2, or the data section 160 is set by performing a predetermined calculation. In this context, it is noted that for corresponding method steps and features, as well as identical components and components having the same effect, reference is made to the above description. Furthermore, aspects and details which are mentioned with respect to one embodiment may also be applied with respect to another embodiment.

The telegrams 150 used in the communication network 100 for data exchange may include length information, i.e. information about the number of data sections 155 of a telegram 150. The length information may be included in data sections 155 at the beginning of a telegram 150. A disturbance may cause a slave subscriber 120 to receive a larger or smaller number of data sections 155 deviating from the length information when receiving a telegram 150, resulting in a length error.

Figure 5:
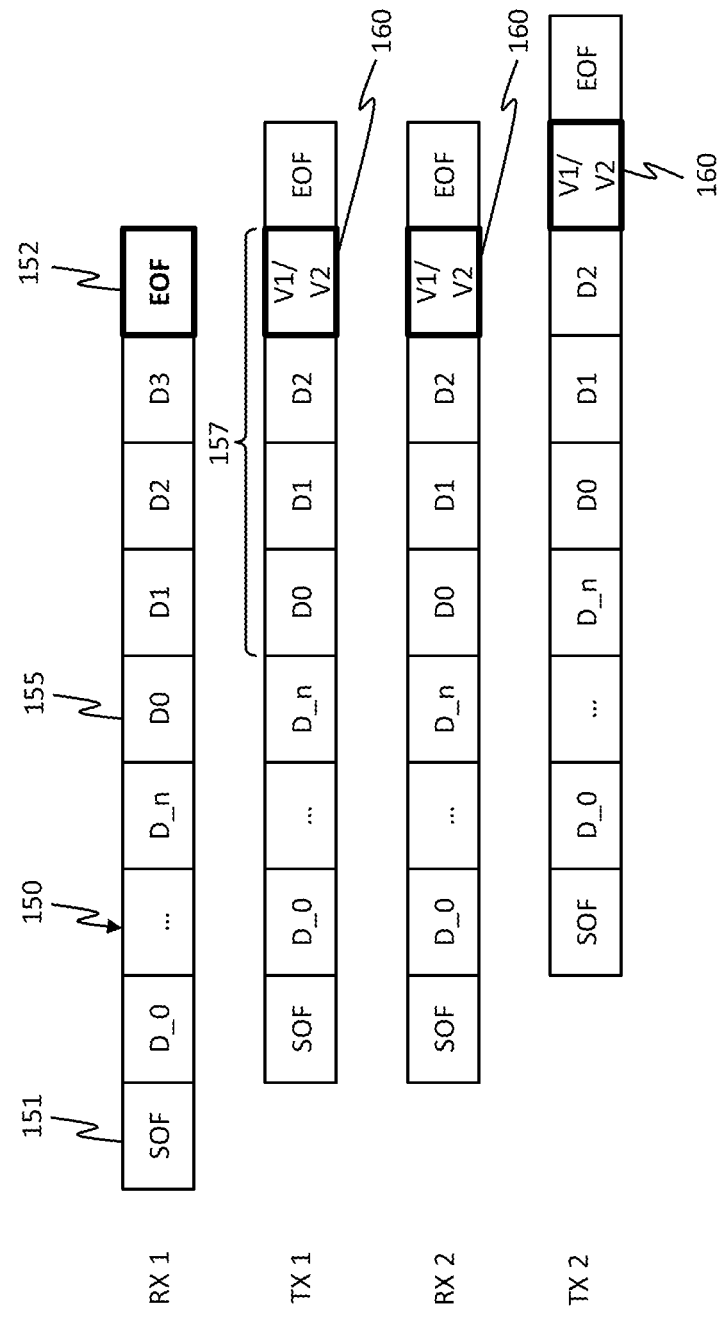
FIG. 5 is a diagram showing an occurrence of a length error in the form of a telegram that is too short.

The diagram of FIG. 5 shows an occurrence of a length error in the form of a telegram 150 that is too short. FIG. 5 shows as an example in which the second slave subscriber $120_1$ receives the EOF field 152 indicating the end of the telegram 150 already after the third data section D3, and thus too early. Here, the number of received data sections 155 is smaller than the number of data sections 155 represented by the length information of the telegram 150.

After the length error has been detected by the second slave subscriber $120_1$, the shifted forwarding of the telegram 150 to the next or third slave subscriber $120_2$ is terminated by the second slave subscriber $120_1$ transmitting a characterizing data section 160 after the second data section D2 and then terminating the transmission of the telegram 150 by transmitting the EOF field 152. Furthermore, an incrementing of the initial-error counter 130 and, as the case may be, of a further error counter 132 of the second slave subscriber $120_1$ referring to a length error (telegram 150 too short) takes place.

According to the method variant of FIG. 5, the characterizing data section 160 is selected from a first predetermined data section V1 and a second predetermined data section V2. The telegram 150 sent by the second slave subscriber $120_1$ to the next or third slave subscriber $120_2$ and received by the latter comprises an end portion 157 including the zeroth data section D0, the first data section D1, the second data section D2 and the characterizing data section 160 (cf. first transmission TX 1 and second receipt RX 2). The check value represented by the end portion 157 relates to the preceding further zeroth to nth data sections D_0 to D_n. The second slave subscriber $120_1$ selects, according to the above description of FIG. 3, one of the two predetermined data sections V1, V2 in such a way that the next or third subscriber $120_2$ receives an end portion 157 which reproduces an invalid check value or which reproduces an invalid check value that differs as much as possible from a valid check value.

In this respect, the telegram 150 received by the next or third slave subscriber $120_2$ comprises an end portion 157 representing an invalid check value, so that the telegram 150 may be recognized as faulty by the third slave subscriber $120_2$. Due to the characterizing data section 160, the telegram 150 is further identified in a recognizable manner for the third slave subscriber $120_2$, so that the error of the telegram 150 is taken into account by the latter as a subsequent error. This is done by incrementing the subsequent-error counter 131 of the third slave subscriber $120_2$.

FIG. 5 further shows that the third slave subscriber $120_2$ also forwards the faulty telegram 150 with a characterizing data section 160 at its end to the next slave subscriber 120 (last slave subscriber $120_3$, cf. FIG. 1) (cf. second transmission TX 2). Here, the third slave subscriber $120_2$ performs the same steps as the second slave subscriber $120_1$, in that the characterizing data section 160 is selected from one of the first or second predetermined data sections V1, V2 and is transmitted after the second data section D2.

Figure 6:
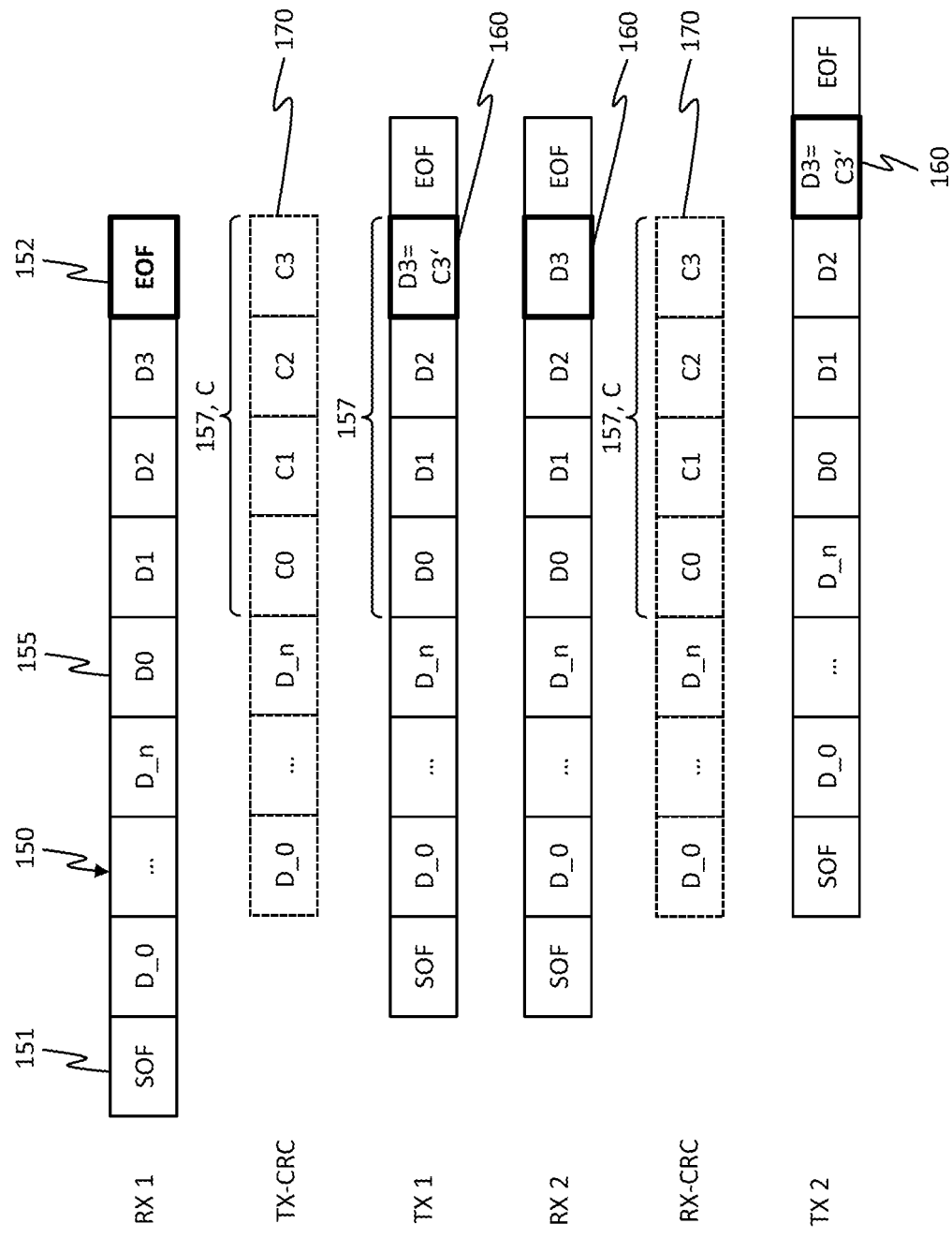
FIG. 6 is a diagram showing a further method variant which may be carried out in the event of a length error in the form of a telegram being too short.

The diagram of FIG. 6 shows a further method variant which may be carried out in the event of a length error in the form of a telegram 150 being too short. Here, too, the second slave subscriber $120_1$, after detecting the length error, terminates the forwarding of the telegram 150 to the next or third slave subscriber $120_2$ by the second slave subscriber $120_1$ transmitting a characterizing data section 160 after the second data section D2 and then terminating the transmission of the telegram 150 by transmitting the EOF field 152 (cf. first transmission TX 1). Furthermore, an incrementing of the initial-error counter 130 and, as the case may be, of a further error counter 132 of the second slave subscriber $120_1$ referring to a length error (shortened telegram 150) is carried out.

In the method variant of FIG. 6, the characterizing data section 160 is set by performing a predetermined calculation. For this purpose, the second slave subscriber $120_1$ calculates a fictitious valid check value C comprising the zeroth partial value C0, the first partial value C1, the second partial value C2 and the third partial value C3 for the further zeroth to nth data sections D_0 to D_n previously sent to the next or third subscriber $120_2$. In this process, the second slave subscriber $120_1$ provides a transmission of a fictitious correct telegram 170 as a basis, the end portion 157 of which would reflect the valid check value C (cf first check value calculation TX-CRC). Furthermore, the second slave subscriber $120_1$ forms a third alternative value C3' by applying a predetermined calculation algorithm (e.g. inverting) to the third partial value C3. This is sent as a characterizing data section 160 or third data section D3, which corresponds here to the third alternative value C3', to the next or third slave subscriber $120_2$ after the second data section D2.

The telegram 150 received by the next or third slave subscriber $120_2$ comprises an end portion 157 representing an invalid check value comprising the zeroth data section D0, the first data section D1, the second data section D2 and the characterizing data section 160, so that the telegram 150 may be recognized as erroneous by the third slave subscriber $120_2$. Furthermore, the telegram 150 is identified as a subsequent error for the third slave subscriber $120_2$ in a comprehensible manner by the characterizing data section 160 or the third data section D3, which corresponds here to the third alternative value C3'.

For this purpose, the third slave subscriber $120_2$ performs the same calculation as previously performed by the second slave subscriber $120_1$, in that the third slave subscriber $120_2$ calculates a fictitious valid check value C with the zeroth partial value C0, the first partial value C1, the second partial value C2 and the third partial value C3 for the further zeroth to nth data sections D_0 to D_n received by the third slave subscriber $120_2$. In doing so, the third slave subscriber $120_2$ provides a receipt of a fictitious correct telegram 170 as a basis, the end portion 157 of which would reflect the correct check value C (cf. second check value calculation RX-CRC). Furthermore, the third slave subscriber $120_2$ determines a third alternative value C3' by applying the predetermined calculation algorithm to the third partial value C3. If there is a match between the calculated third alternative value C3' and the received third alternative value C3', the third slave subscriber $120_2$ may detect the characterizing and consider the telegram 150 as a subsequent error. For this purpose, the subsequent-error counter 131 of the third slave subscriber $120_2$ is incremented.

FIG. 6 further illustrates that the third slave subscriber $120_2$ also forwards the faulty telegram 150 with a characterizing data section 160 at its end to the next slave subscriber 120 (last slave subscriber $120_3$, cf. FIG. 1) (cf. second transmission TX 2). Here, the third slave subscriber $120_2$ performs the same steps as the second slave subscriber $120_1$, in that the characterizing data section 160 is set by performing the predetermined calculation and is sent after the second data section D2.

Figure 7:
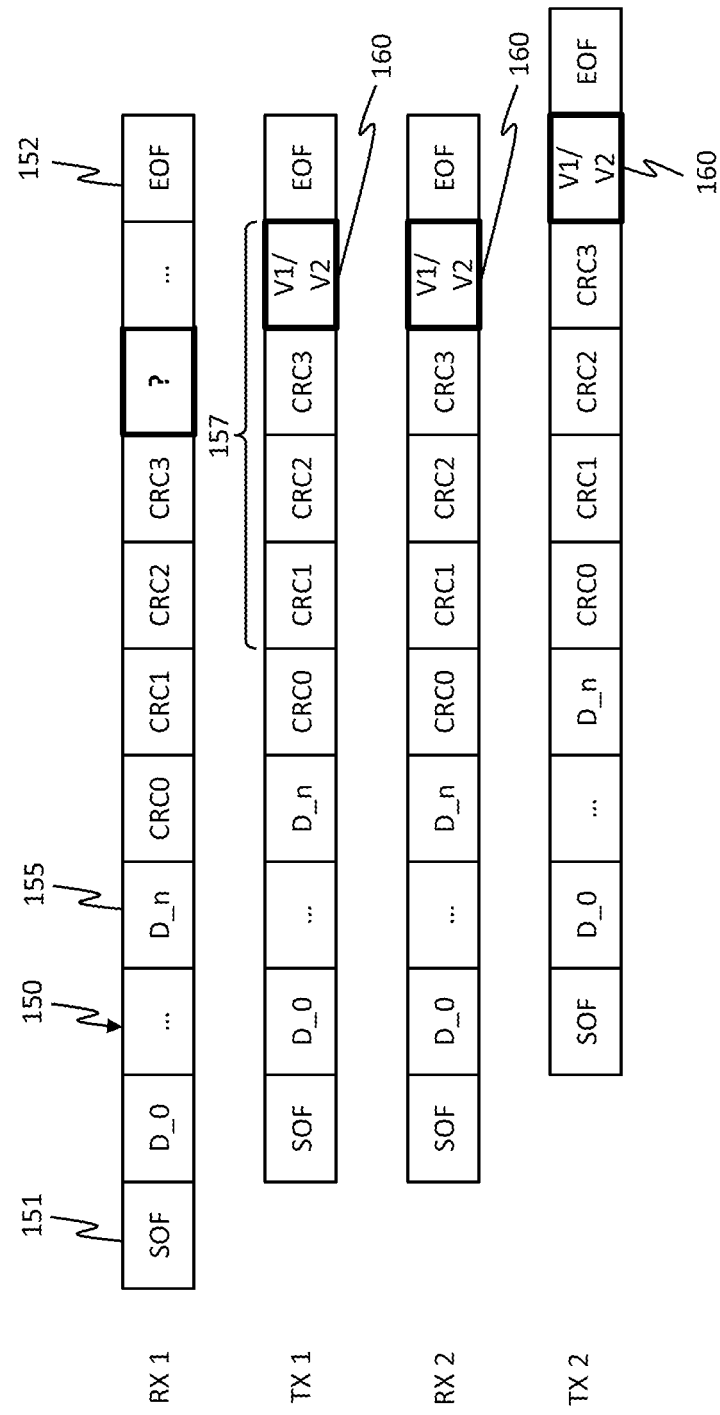
FIG. 7 is a diagram showing a length error in the form of a telegram 150 that is too long.

The diagram of FIG. 7 shows a length error in the form of a telegram 150 that is too long. FIG. 7 shows as an example that the second slave subscriber $120_1$, when receiving the telegram 150, after a third check value data section CRC3 still receives (at least) one data section 155 instead of the EOF field 152, which is marked with a question mark in FIG. 7. Here, the number of received data sections 155 is larger than the number of data sections 155 represented by the length information of the telegram 150. In FIG. 7, the four data sections 155 located before the data section 155 marked with the question mark are shown as zeroth check value data section CRC0, first check value data section CRC1, second check value data section CRC2 and third check value data section CRC3. Before detecting the length error, the four check value data sections CRC0, CRC1, CRC2, CRC3 are treated as an end portion 157 by the second slave subscriber $120_1$ and are thus interpreted as a check value with respect to the preceding further zeroth to nth data sections D_0 to D_n. This is because if there was no length error, the four check value data sections CRC0, CRC1, CRC2, CRC3 would form the last data sections 155 of the telegram 150. Therefore, the four correct check value data sections CRC0, CRC1, CRC2, CRC3 are already transmitted to the next or third slave subscriber $120_2$, which reflect an error-free condition of the previously transmitted further zeroth to nth data sections D_0 to D_n.

After the length error has been detected, the second slave subscriber $120_1$ thus sends a characterizing data section 160 and subsequently the EOF field 152 to the next or third slave subscriber $120_2$ after the third check value data section CRC3. Furthermore, the initial-error counter 130 and, as the case may be, a further error counter 132 of the second slave subscriber $120_1$ relating to a length error (telegram 150 that is too long) are incremented.

In the method variant of FIG. 7, the characterizing data section 160 is selected from a first predetermined data section V1 and a second predetermined data section V2. The telegram 150 sent by the second slave subscriber $120_1$ to the next or third slave subscriber $120_2$ and received by the latter comprises an end portion 157 including the first check value data section CRC1, the second check value data section CRC2, the third check value data section CRC3 and the characterizing data section 160 (cf. first transmission TX 1 and second receipt RX 2). The check value represented by the end portion 157 refers to the preceding data sections 155, i.e. in the present case the data sections 155 starting from the further zeroth data section D_0 up to the zeroth check value data section CRC0. The second slave subscriber $120_1$ selects, analogously to the above description, one of the two predetermined data sections V1, V2. This is done in such a way that the next or third slave subscriber $120_2$ receives an end portion 157 referring to the further zeroth data section D_0 to the zeroth check value data section CRC0, which represents an invalid check value or which represents an invalid check value that differs as much as possible from a valid check value.

The telegram 150 received by the next or third subscriber $120_2$ comprises an end portion 157 representing an invalid check value, comprising the check value data section CRC1, the check value data section CRC2, the check value data section CRC3 and the characterizing data section 160, so that the telegram 150 may be recognized as faulty by the third slave subscriber $120_2$. The third slave subscriber $120_2$ may also recognize the presence of an error by the fact that the received telegram 150 has too great a length due to the additional characterizing data section 160 at its end. Due to the characterizing data section 160, the telegram 150 is further identified in a recognizable manner for the third slave subscriber $120_2$, so that the faulty telegram 150 is taken into account by it as a subsequent error. This is done by incrementing the subsequent-error counter 131 of the third slave subscriber $120_2$.

FIG. 7 further shows that the third slave subscriber $120_2$ also forwards the faulty telegram 150 with a characterizing data section 160 at its end to the next slave subscriber 120 (last slave subscriber $120_3$, cf. FIG. 1) (cf. second transmission TX 2). Here, the third slave subscriber $120_2$ carries out the same steps as the second slave subscriber $120_1$, in that the characterizing data section 160 is selected from one of the first or second predetermined data sections V1, V2 and is transmitted after the third check value data section CRC3.

Figure 8:
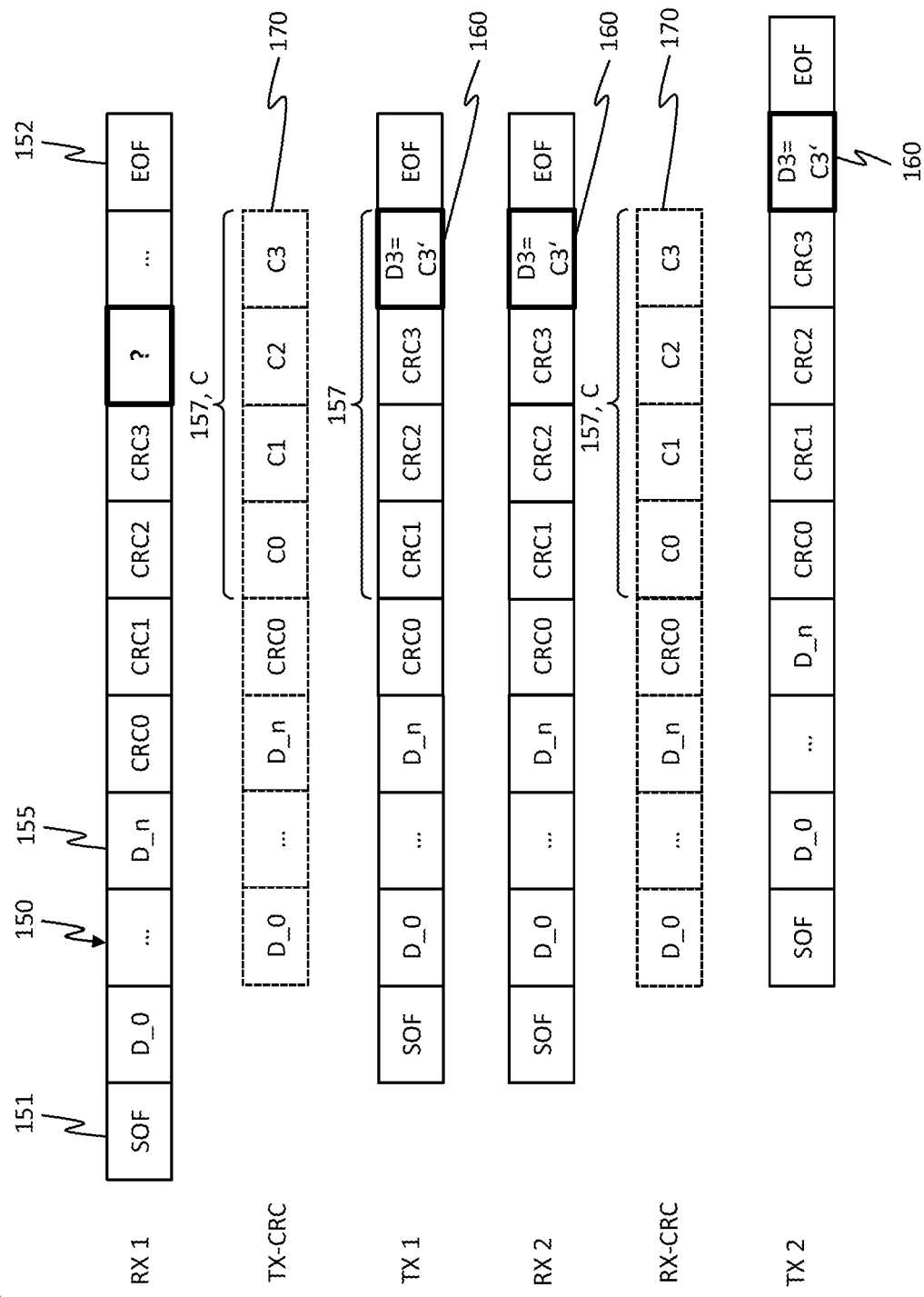
FIG. 8 is a diagram showing a further method variant which may be carried out in the event of a length error in the form of a telegram which is too long.

The diagram of FIG. 8 shows a further method variant which may be carried out in the event of a length error in the form of a telegram 150 which is too long. Here too, after the length error has been detected, the second slave subscriber $120_1$ sends a characterizing data section 160 following the third check value data section CRC3 and then the EOF field 152 to the next or third slave subscriber $120_2$ (cf. first transmission TX 1). Furthermore, the initial-error counter 130 and, as the case may be, a further error counter 132 of the second slave subscriber $120_1$ relating to a length error (telegram 150 too long) are incremented.

In the method variant of FIG. 8, the characterizing data section 160 is set by performing a predetermined calculation. Here, the second slave subscriber $120_1$ calculates a fictitious valid check value C comprising the zeroth partial value C0, the first partial value C1, the second partial value C2 and the third partial value C3 for data sections 155 previously sent to the next or third subscriber $120_2$ comprising the further zeroth data section D_0 to zeroth check value data section CRC0. In this process, the second slave subscriber $120_1$ provides a transmission of a fictitious correct telegram 170 as a basis, the end portion 157 of which would reflect the valid check value C (cf. first check value calculation TX-CRC). Furthermore, the second slave subscriber $120_1$ forms a third alternative value C3' by applying a predetermined calculation algorithm (e.g. inverting) to the third partial value C3. The third alternative value C3' is sent to the next or third slave subscriber $120_2$ as a characterizing data section 160 or third data section D3, which here corresponds to the third alternative value C3', after the third check value data section CRC3.

The telegram 150 received by the next or third subscriber $120_2$ comprises an end portion 157 representing an invalid check value comprising the first check value data section CRC1, the second check value data section CRC2, the third check value data section CRC3 and the characterizing data section 160, so that the telegram 150 may be recognized as faulty by the third slave subscriber $120_2$. The third slave subscriber $120_2$ may also recognize the occurrence of an error by the fact that the received telegram 150 has too great a length due to the additional characterizing data section 160 at its end. The telegram 150 is also identified as a subsequent error for the third slave subscriber $120_2$ by the characterizing data section 160 or the third data section D3, which corresponds here to the third alternative value C3', in a manner recognizable for the third slave subscriber $120_2$.

For this purpose, the third slave subscriber $120_2$ performs the same calculation as previously performed by the second slave subscriber $120_1$, in that the third slave subscriber $120_2$ calculates a fictitious valid check value C with the zeroth partial value C0, the first partial value C1, the second partial value C2 and the third partial value C3 for the data sections 155 received by the third slave subscriber $120_2$ comprising the further zeroth data section D_0 to zeroth check value data section CRC0. Here, the third slave subscriber $120_2$ provides a receipt of a fictitious correct telegram 170 as a basis, the end portion 157 of which would reflect the correct check value C (cf. second check value calculation RX-CRC). Furthermore, the third slave subscriber $120_2$ determines a third alternative value C3' by applying the predetermined calculation algorithm to the third partial value C3. If the calculated third alternative value C3' and the received third alternative value C3' match, the third slave subscriber $120_2$ may detect the characterization and consider the telegram 150 as a subsequent error. For this purpose, the subsequent-error counter 131 of the third slave subscriber $120_2$ is incremented.

FIG. 8 further shows that the third slave subscriber $120_2$ also forwards the faulty telegram 150 with a characterizing data section 160 at its end to the next slave subscriber 120 (last slave subscriber $120_3$, cf. FIG. 1) (cf second transmission TX 2). Here, the third slave subscriber $120_2$ performs the same steps as the second slave subscriber $120_1$, in that the characterizing data section 160 is set by performing the predetermined calculation and is sent after the third check value data section CRC3.

An occurrence of an error may further consist in that a slave subscriber 120 receives a number of data sections 155 corresponding to a length information when receiving a telegram 150 including the length information, but a check value error is present in the form of an invalid check value.

Figure 9:
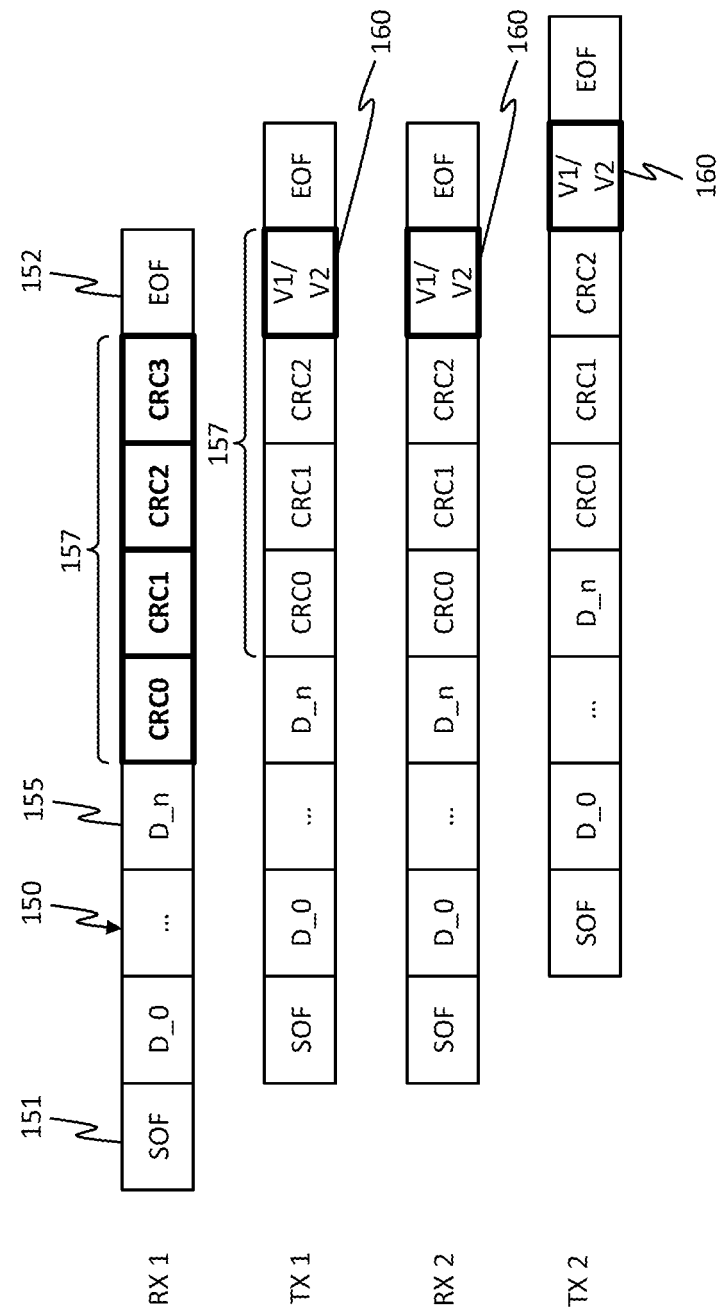
FIG. 9 is a diagram illustrating the occurrence of such a check value error.

The diagram of FIG. 9 illustrates the occurrence of such a check value error. Herein, the second slave subscriber $120_1$ receives a telegram 150 in which the end portion 157 comprising the four check value data sections CRC0, CRC1, CRC2, CRC3 reproduces a check value which deviates from an expected check value specified by or linked to the preceding further zeroth to nth data sections D_0 to D_n. Therefore, after determining the check value error, which may be performed by the second slave subscriber $120_1$ based on a comparison of the aforementioned check values, the second slave subscriber $120_1$ sends a characterizing data section 160 and subsequently the EOF field 152 to the next or third slave subscriber $120_2$ after the second check value data section CRC2. Furthermore, the initial-error counter 130 and, as the case may be, a further error counter 132 of the second slave subscriber $120_1$ relating to a check value error are incremented.

In the method variant of FIG. 9, the characterizing data section 160 is selected from a first predetermined data section V1 and a second predetermined data section V2. The telegram 150 sent by the second slave subscriber $120_1$ to the next or third slave subscriber $120_2$ and received by the latter has an end portion 157 comprising the zeroth check value data section CRC0, the first check value data section CRC1, the second check value data section CRC2 and the characterizing data section 160 (cf. first transmission TX 1 and second receipt RX 2). The check value represented by the end portion 157 relates to the preceding further zeroth to nth data sections D_0 to D_n. Analogously to the above description, the second slave subscriber $120_1$ selects one of the first or second predetermined data sections V1, V2 in such a way that the next or third slave subscriber $120_2$ receives an end portion 157 presently referring to the further zeroth to nth data sections D_0 to D_n, which reproduces an invalid check value or which reproduces an invalid check value differing as much as possible from a valid check value.

Therefore, the telegram 150 received by the next or third subscriber $120_2$ comprises an end region 157 representing an invalid check value comprising the zeroth check value data section CRC0, the first check value data section CRC1, the second check value data section CRC2, and the characterizing data section 160, so that the telegram 150 may be identified as erroneous by the third slave subscriber $120_2$. Due to the characterizing data section 160, the telegram 150 is further characterized in a recognizable manner for the third slave subscriber $120_2$, so that the telegram 150 is taken into account as a subsequent error by the third slave subscriber $120_2$. This is done by incrementing the subsequent-error counter 131 of the third slave subscriber $120_2$.

FIG. 9 further shows that the third slave subscriber $120_2$ also forwards the faulty telegram 150 with a characterizing data section 160 at its end to the next slave subscriber 120 (last slave subscriber $120_3$, cf. FIG. 1) (cf. second transmission TX 2). Here, the third slave subscriber $120_2$ performs the same steps as the second slave subscriber $120_1$, in that the characterizing data section 160 is selected from one of the first or second predetermined data sections V1, V2 and is transmitted after the second check value data section CRC2.

Figure 10:
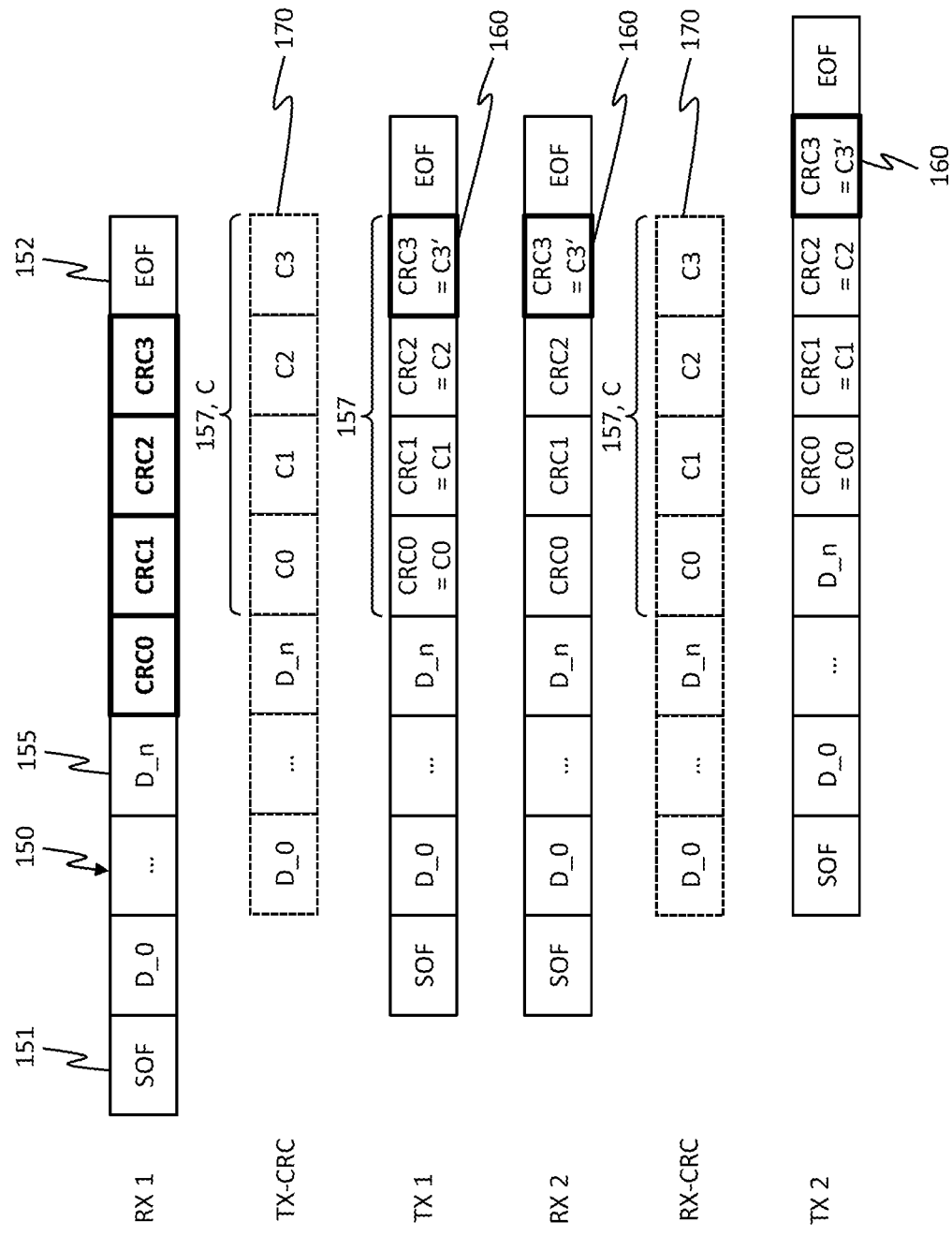
FIG. 10 is a diagram showing a further method variant which may be considered if a known and correct telegram length is available and a check value error occurs.

The diagram of FIG. 10 shows a further method variant which may be considered if a known and correct telegram length is available and a check value error occurs. Here, too, the second slave subscriber $120_1$, after detecting the check value error, sends a characterizing data section 160 after the second check value data section CRC2 and subsequently the EOF field 152 to the next or third slave subscriber $120_2$. Furthermore, the initial-error counter 130 and, as the case may be, a further error counter 132 of the second slave subscriber $120_1$ relating to a check value error are incremented.

In the method variant of FIG. 10, the characterizing data section 160 is set by performing a predetermined calculation. The second slave subscriber $120_1$ here calculates a fictitious valid check value C comprising the zeroth partial value C0, the first partial value C1, the second partial value C2 and the third partial value C3 for further zeroth to nth data sections D_0 to D_n previously sent to the next or third subscriber $120_2$. In this process, the second subscriber $120_1$ provides a transmission of a fictitious correct telegram 170 as a basis, the end portion 157 of which would reflect the valid check value C (cf. first check value calculation TX-CRC). Furthermore, the second slave subscriber $120_1$ forms a third alternative value C3' by applying a predetermined calculation algorithm (e.g. inverting) to the third partial value C3. The third alternative value C3' is sent to the next or third slave subscriber $120_2$ as a characterizing data section 160 or third check value data section CRC3, which here corresponds to the third alternative value C3', after the second check value data section CRC2.

The telegram 150 received by the next or third subscriber $120_2$ comprises an end portion 157 representing an invalid check value, which includes the zeroth check value data section CRC0, the first check value data section CRC1, the third check value data section CRC2, and the characterizing data section 160. As indicated in FIG. 10, the zeroth, first and second check value data sections CRC0, CRC1, CRC2 may correspond to the zeroth, first and second partial values C0, C1, C2 of the fictitious telegram 170 (cf. first check value calculation TX-CRC) used by the previous or second slave subscriber $120_1$, respectively, in calculating the third alternative value C3'. Due to the end portion 157 reproducing an invalid check value, the telegram 150 may be recognized as erroneous by the next or third slave subscriber $120_2$. Also, the telegram 150 is identified as a subsequent error by the characterizing data section 160 or the third check value data section CRC3, which here corresponds to the third alternative value C3', in a manner recognizable for the third slave subscriber $120_2$.

For this purpose, the third slave subscriber $120_2$ performs the same calculation as previously performed by the second slave subscriber $120_1$, in that the third slave subscriber $120_2$ calculates a fictitious valid check value C with the zeroth, first, second and third partial values C0, C1, C2, C3 for the further zeroth to nth data sections D_0 to D_n received by the third slave subscriber $120_2$. In doing so, the third slave subscriber $120_2$ provides a receipt of a fictitious correct telegram 170 as a basis, the end portion 157 of which would reflect the correct check value C (cf. second check value calculation RX-CRC). Furthermore, the third slave subscriber $120_2$ determines a third alternative value C3' by applying the predetermined calculation algorithm to the third partial value C3. If there is a match between the calculated third alternative value C3' and the received third alternative value C3', the third slave subscriber $120_2$ may detect the characterization and consider the telegram 150 as a subsequent error. For this purpose, the subsequent-error counter 131 of the third slave subscriber $120_2$ is incremented.

FIG. 10 further shows that the third slave subscriber $120_2$ also forwards the faulty telegram 150 with a characterizing data section 160 at its end to the next slave subscriber 120 (last slave subscriber $120_3$, cf. FIG. 1) (cf. second transmission TX 2). Herein, the third slave subscriber $120_2$ performs the same steps as the second slave subscriber $120_1$ in that the characterizing data section 160 is set by the predetermined calculation and is sent after the second check value data section CRC2.

With reference to the communication network 100, it is further possible that the telegrams 150 do not contain any length information. When a telegram 150 is received, its end portion 157 may in a corresponding manner reproduce an invalid check value and thus indicate an error, so that a check value error occurs.

Figure 11:
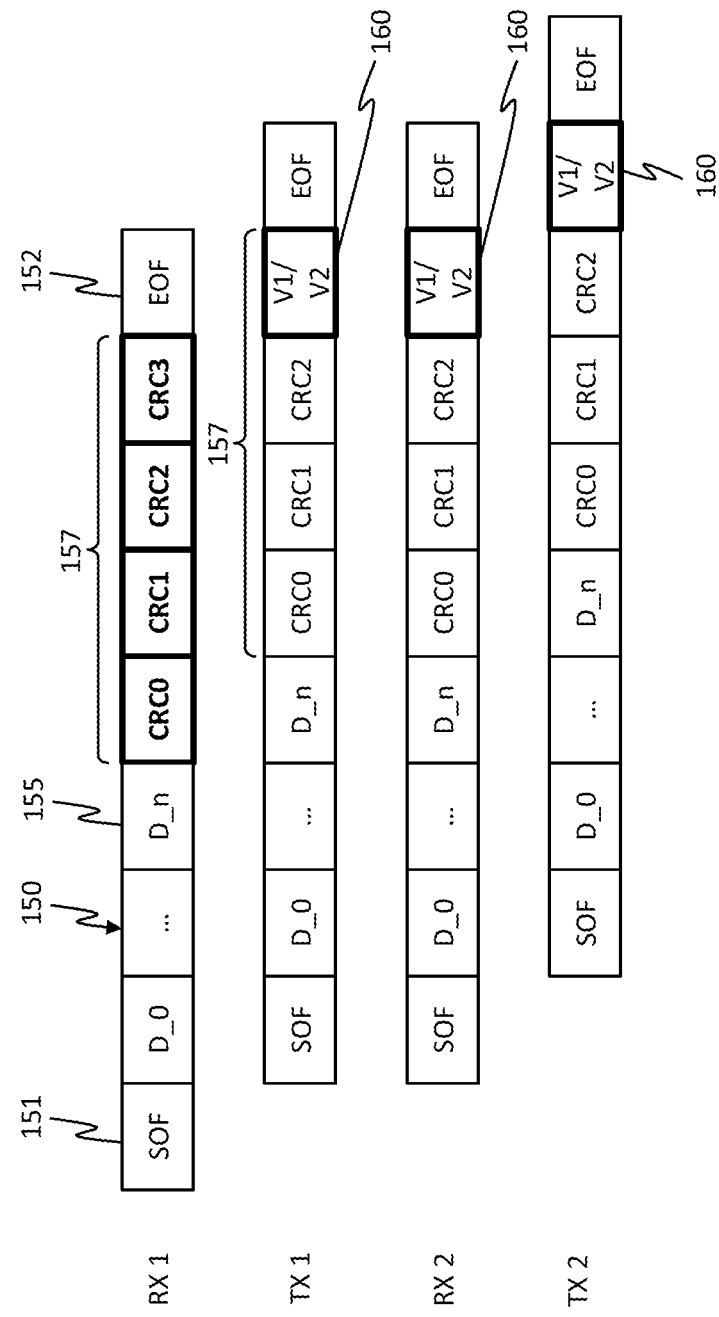
FIG. 11 is a diagram showing the occurrence of such a check value error.

The diagram of FIG. 11 shows the occurrence of such a check value error. Herein, the second slave subscriber $120_1$ receives a telegram 150 in which the end portion 157 comprising the four check value data sections CRC0, CRC1, CRC2, CRC3 reproduces a check value which deviates from an expected check value specified by or linked to the preceding further zeroth to nth data sections D_0 to D_n. Since the telegram 150 does not contain any length information, the second slave subscriber $120_1$ may only detect the check value error until the EOF field 152 is received. This is because the second slave subscriber $120_1$ may determine the telegram end, and thus the end portion 157 comprising the four check value data sections CRC0, CRC1, CRC2, CRC3, only on the basis of the EOF field 152. After detecting the check value error, the second slave subscriber $120_1$ sends a characterizing data section 160 after the second check value data section CRC2 and then the EOF field 152 to the next or third slave subscriber $120_2$. Furthermore, incrementing of the initial-error counter 130 and, as the case may be, of a further error counter 132 of the second slave subscriber $120_1$ relating to a check value error takes place.

In the method variant shown in FIG. 11, the characterizing data section 160 is selected from a first or second predetermined data section V1 or V2 in accordance with the variant shown in FIG. 9. The telegram 150 sent by the second slave subscriber $120_1$ to the next or third slave subscriber $120_2$ has an end portion 157 comprising the zeroth, first and second check value data section CRC0, CRC1, CRC2 and the characterizing data section 160 (cf. first transmission TX 1 and first receipt RX 2). The check value represented by the end portion 157 relates to the further zeroth to nth data sections D_0 to D_n. The second slave subscriber $120_1$ selects one of the two predetermined data sections V1, V2 in such a way that the next or third subscriber $120_2$ receives an end portion 157 which reproduces an invalid check value or which reproduces an invalid check value that differs as much as possible from a valid check value.

The telegram 150 received by the next or third subscriber $120_2$ comprises an end portion 157 representing an invalid check value, so that the telegram 150 may be recognized as erroneous by the third slave subscriber $120_2$. Due to the characterizing data section 160, the telegram 150 is further identified in a recognizable manner for the third slave subscriber $120_2$, so that the telegram 150 is taken into account as a subsequent error by the third slave subscriber $120_2$. This is done by incrementing the subsequent-error counter 131 of the third slave subscriber $120_2$.

FIG. 11 further shows that the third slave subscriber $120_2$ also forwards the faulty telegram 150 with a characterizing data section 160 at its end to the next slave subscriber 120 (last slave subscriber $120_3$, cf. FIG. 1) (cf. second transmission TX 2). Here, the third slave subscriber $120_2$ performs the same steps as the second slave subscriber $120_1$ in that the characterizing data section 160 is selected from one of the first or second predetermined data sections V1, V2 and is transmitted after the second check value data section CRC2.

Figure 12:
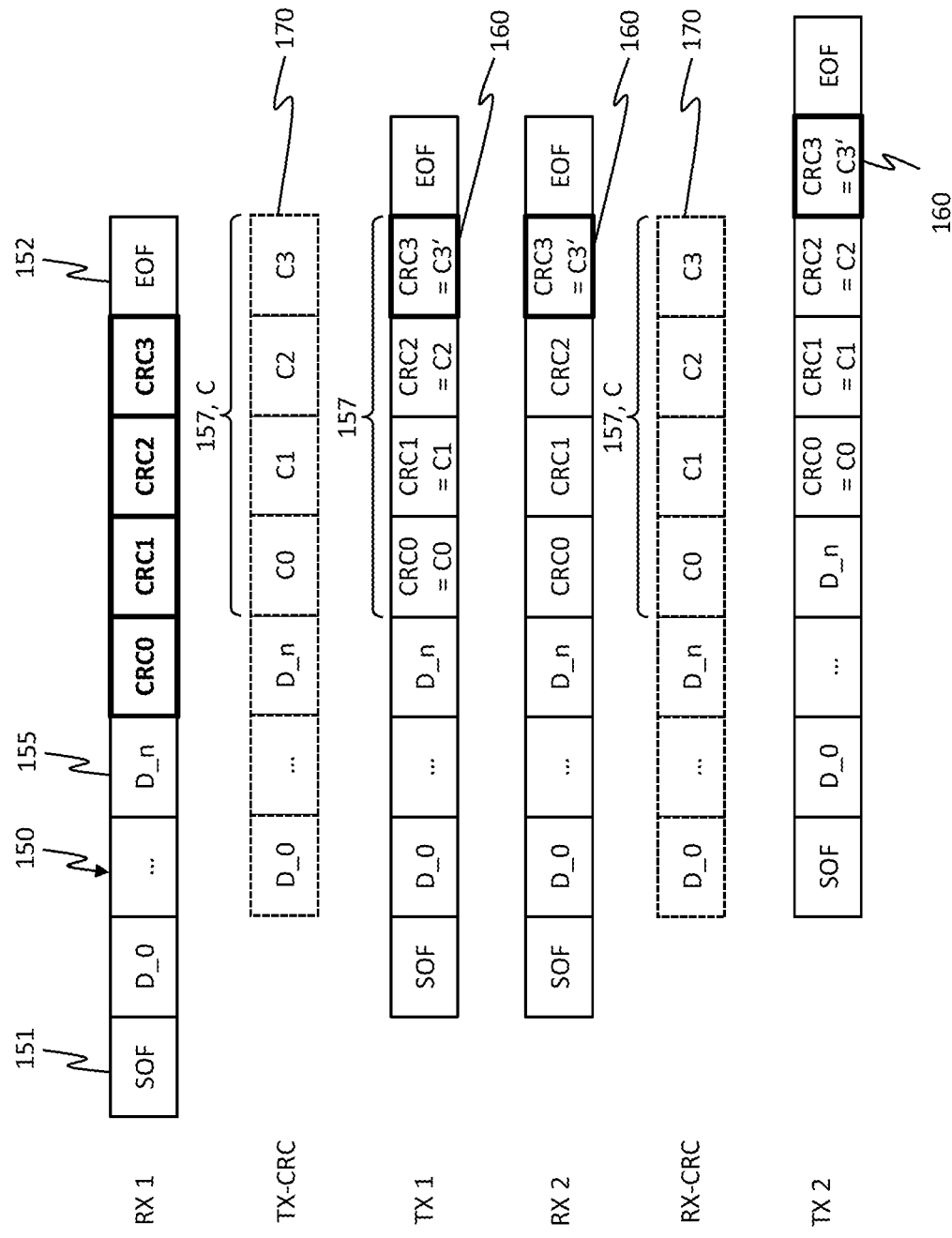
FIG. 12 is a diagram showing a further method variant which may be considered in case of an unknown telegram length and occurrence of a check value error.

The diagram of FIG. 12 shows a further method variant which may be considered in case of an unknown telegram length and occurrence of a check value error. Here, too, the second slave subscriber $120_1$, after detecting the check value error, sends a characterizing data section 160 after the second check value data section CRC2 and subsequently the EOF field 152 to the next or third slave subscriber $120_2$. Furthermore, the initial-error counter 130 and, if applicable, a further error counter 132 of the second slave subscriber $120_1$ relating to a check value error are incremented.

In the method variant shown in FIG. 12, the characterizing data section 160 is set as in the variant of FIG. 10 by performing a predetermined calculation. Here, the second slave subscriber $120_1$ calculates a fictitious valid check value C comprising the zeroth, first, second and third partial values C0, C1, C2, C3 for further zeroth to nth data sections D_0 to D_n previously sent to the next or third slave subscriber $120_2$. In this process, the second slave subscriber $120_1$ provides a transmission of a fictitious correct telegram 170 as a basis, the end portion 157 of which would reflect the valid check value C (cf. first check value calculation TX-CRC). Furthermore, the second slave subscriber $120_1$ forms a third alternative value C3' by applying a predetermined calculation algorithm (e.g. inverting) to the third partial value C3. This is sent to the next or third slave subscriber $120_2$ as a characterizing data section 160 or third check value data section CRC3, which here corresponds to the third alternative value C3', after the second check value data section CRC2.

The telegram 150 received by the next or third slave subscriber 120$_2$ comprises an end portion 157 representing an invalid check value, which includes the zeroth, first and second check value data sections CRC0, CRC1, CRC2 and the characterizing data section 160. As indicated in FIG. 12, the zeroth, first and second check value data sections CRC0, CRC1, CRC2 may correspond to the zeroth, first and second partial values C0, C1, C2 of the fictitious telegram 170 (cf. first check value calculation TX-CRC) used by the previous or second slave subscriber 120$_1$, respectively, in calculating the third alternative value C3'. Due to the end portion 157 reproducing an invalid check value, the telegram 150 may be recognized as erroneous by the next or third slave subscriber 120$_2$. Also, the telegram 150 is identified as a subsequent error by the characterizing data section 160 or the third check value data section CRC3, which corresponds here to the third alternative value C3', in a manner recognizable for the third slave subscriber 120$_2$.

For this purpose, the third slave subscriber 120$_2$ performs the same calculation as previously performed by the second slave subscriber 120$_1$, in that the third subscriber 120$_2$ calculates a fictitious valid check value C with the zeroth, first, second, third partial values C0, C1, C2, C3 for the further zeroth to nth data sections D_0 to D_n received by the third slave subscriber 120$_2$. In doing so, the third slave subscriber 120$_2$ provides a receipt of a fictitious correct telegram 170 as a basis, the end portion 157 of which would reflect the correct check value C (cf. second check value calculation RX-CRC). Furthermore, the third slave subscriber 120$_2$ determines a third alternative value C3' by applying the predetermined calculation algorithm to the third partial value C3. If the calculated third alternative value C3' and the received third alternative value C3' match, the third subscriber 120$_2$ may detect the characterization and consider the telegram 150 as a subsequent error. For this purpose, the subsequent-error counter 131 of the third subscriber 120$_2$ is incremented.

FIG. 12 further shows that the third slave subscriber 120$_2$ also forwards the faulty telegram 150 with a characterizing data section 160 at its end to the next slave subscriber 120 (last slave subscriber 120$_3$, cf. FIG. 1) (cf second transmission TX 2). Here, the third slave subscriber 120$_2$ performs the same steps as the second slave subscriber 120$_1$, in that the characterizing data section 160 is set as indicated above and sent after the second check value data section CRC2.

It is noted that the method variants and steps described with reference to the diagrams of FIGS. 3 to 12 may be carried out by all of the slave subscribers 120 of the communication network 100.

In addition to the embodiments described above and illustrated in the figures, further embodiments are conceivable, which may include further variations and/or combinations of features.

A possible modification is e.g. to use only initial-error counters 130 and, as the case may be, error counters 132 referring to error types and no subsequent-error counters 131, or to use slave subscribers 120 which comprise initial-error counters 130 and, as the case may be, error counters 132 referring to error types and no subsequent-error counters 131. In this way, too, it is possible to localize error sources, in this case on the basis of the initial-error counters 130. Herein, a subscriber 120 may consider a characterized telegram 150 as a subsequent error by not incrementing the associated initial-error counter 130. If there is no characterization, the initial-error counter 130 may be incremented as indicated above.

Furthermore, it is pointed out that the communication network 100 shown in FIG. 1, on the basis of which the method was described, represents only one possible exemplary embodiment. Deviating from this, other embodiments may be considered which, for example, comprise a different number of slave subscribers 120 and/or a different structure, e.g. a multiple ring structure. Also, the communication network 100 may be an Ethernet-based system with an embodiment deviating from the above description, for example with a different transmission rate. For example, a transmission rate of 100 Mbit/s is possible. Herein, 4B/5B coding may be provided, i.e. 4-bit data units coded as 5-bit data units are transmitted.

Although the invention has been further illustrated and described in detail by embodiments, the invention is not limited by the disclosed examples and other variations may be derived therefrom by those skilled in the art without departing from the scope of protection of the invention.

The invention claimed is:

1. A method for operating a communication network, wherein the communication network comprises a plurality of subscribers, the method comprising:
    wherein data are exchanged in the communication network between the subscribers in the form of telegrams,
    wherein the telegrams comprise a plurality of data sections,
    wherein the subscribers interpret an end portion of the telegrams as a check value associated with data sections preceding said end portion of the telegrams for checking an absence of errors in the preceding data sections of the telegrams, the check value being calculated by the subscribers according to a predetermined calculation procedure from the respective preceding data sections of the telegrams and thereby being associated with the respective preceding data sections of the telegrams in a predetermined manner,
    wherein the telegrams are processed by the subscribers in pass-through, so that the telegrams are received by the subscribers and are forwarded to a respective next subscriber while being received,
    wherein the subscribers, in a case in which an error of a telegram is detected when receiving the telegram, perform sending the telegram to a next subscriber with a characterizing data section of the telegram at its end, so that the telegram sent to the next subscriber comprises an end portion representing an invalid check value,
    wherein the characterizing data section is part of the end portion of the telegram which is interpreted as the check value associated with the respective preceding data sections of the telegram in the predetermined manner, and
    wherein by the characterizing data section the telegram is characterized for the next subscriber such that the telegram is not considered as an initial error but as a subsequent error;
    wherein the subscribers select the characterizing data section from a group comprising a first and a second predetermined data section; and
    wherein the method further comprises at least one of the following:
    A) for the selecting, a check is carried out as to whether, when sending the first predetermined data section, a valid calculated check value for previously sent data sections is present, wherein:
        if an invalid calculated check value is present, the first predetermined data section is selected as the characterizing data section, and if a valid calculated check value is present, the second predetermined data section is selected as the characterizing data section; and B) for the selecting, a check is carried out as to whether, when sending the first predetermined data section and when sending the second predetermined data section, an invalid calculated check value for previously sent data sections is present in each case, wherein:

in a case in which a valid calculated check value is present for one of said first and second predetermined data sections, the other of said first and second predetermined data sections is selected as the characterizing data section, and in a case in which an invalid calculated check value is present in each case, the one of the first and second predetermined data sections is selected as the characterizing data section with which a greater difference from a valid calculated check value for previously sent data sections is obtained, as compared to the other of said first and second predetermined data sections.

2. The method according to claim 1, wherein the subscribers select the characterizing data section from a group comprising a plurality of predetermined data sections.

3. The method according to claim 1, wherein the first and second predetermined data sections are inverted with respect to each other.

4. The method according to claim 1, wherein in a case in which the subscribers detect an error when receiving a telegram and the telegram does not comprise a characterizing data section at its end, an error counter of the subscribers relating to an initial error is incremented.

5. The method according to claim 4, wherein the subscribers further determine an error type of the detected error and an error counter of the subscribers relating to the error type is incremented.

6. The method according to claim 1, wherein in a case in which the subscribers detect an error when receiving a telegram and the telegram comprises a characterizing data section at its end, an error counter of the subscribers relating to a subsequent error is incremented.

7. The method according to claim 1, wherein the subscribers, in a case in which an error is detected when receiving a telegram, depending on an error type of the detected error, prematurely terminate sending the telegram to the next subscriber by sending the characterizing data section.

8. The method according to claim 1, comprising at least one of the following:
the communication network comprises a master-slave structure;
the communication network is an Ethernet-based field-bus system or an EtherCAT field-bus system;
a CRC (Cyclic Redundancy Check) check value is used as the check value; or
the characterizing data section is located at an end of the end portion, and is a last data section of the end portion.

9. A communication network configured to perform the method according to claim 1, and comprising the plurality of subscribers,
wherein the subscribers are configured to process the telegrams in pass-through, so that the telegrams are received by the subscribers and are forwarded to the next subscriber while being received,
wherein the subscribers are configured to perform sending the telegram to the next subscriber with the characterizing data section of the telegram at its end, if the error of the telegram is detected when receiving the telegram, so that the telegram sent to the next subscriber comprises the end portion representing the invalid check value.

10. The method according to claim 1, wherein the subscribers are connected via a transmission path, wherein data are physically transmitted on the transmission path as coded data, and wherein an 8B/10B coding is present in that 8-bit data units coded as 10-bit data units are transmitted.

11. A method for operating a communication network, wherein the communication network comprises a plurality of subscribers, the method comprising:
wherein data are exchanged in the communication network between the subscribers in the form of telegrams,
wherein the telegrams comprise a plurality of data sections,
wherein the subscribers interpret an end portion of the telegrams as a check value associated with data sections preceding said end portion of the telegrams for checking an absence of errors in the preceding data sections of the telegrams, the check value being calculated by the subscribers according to a predetermined calculation procedure from the respective preceding data sections of the telegrams and thereby being associated with the respective preceding data sections of the telegrams in a predetermined manner,
wherein the telegrams are processed by the subscribers in pass-through, so that the telegrams are received by the subscribers and are forwarded to a respective next subscriber while being received,
wherein the subscribers, in a case in which an error of a telegram is detected when receiving the telegram, perform sending the telegram to a next subscriber with a characterizing data section of the telegram at its end, so that the telegram sent to the next subscriber comprises an end portion representing an invalid check value,
wherein the characterizing data section is part of the end portion of the telegram which is interpreted as the check value associated with the respective preceding data sections of the telegram in the predetermined manner, and
wherein by the characterizing data section the telegram is characterized for the next subscriber such that the telegram is not considered as an initial error but as a subsequent error;
wherein the subscribers set the characterizing data section by performing a predetermined calculation using at least one previously sent data section;
wherein performing the predetermined calculation comprises determining a valid check value for previously sent data sections and forming an alternative value by applying a predetermined calculation algorithm to a partial value of the determined valid check value at an end thereof, and
wherein the formed alternative value is set as the characterizing data section.

12. The method according to claim 11, wherein the calculation algorithm is an inversion.

13. A method for operating a communication network, wherein the communication network comprises a plurality of subscribers, the method comprising:
wherein data are exchanged in the communication network between the subscribers in the form of telegrams,
wherein the telegrams comprise a plurality of data sections, wherein the subscribers interpret an end portion of the telegrams as a check value for checking an absence of errors in data sections preceding said end portion of the telegrams, wherein the telegrams are processed by the subscribers in pass-through, so that the telegrams are received by the subscribers and are forwarded to a respective next subscriber while being received, wherein the subscribers, in a case in which an error of a telegram is detected when receiving the telegram, perform sending the telegram to a next subscriber with a characterizing data section of the telegram at its end, so that the telegram sent to the next subscriber comprises an end portion representing an invalid check value, wherein the characterizing data section is part of the end portion of the telegram which is interpreted as the check value, wherein by the characterizing data section the telegram is characterized for the next subscriber such that the telegram is not considered as an initial error but as a subsequent error, wherein the subscribers select the characterizing data section from a group comprising a first and a second predetermined data section, and wherein the method further comprises at least one of the following:

A) for the selecting, a check is carried out as to whether, when sending the first predetermined data section, a valid calculated check value for previously sent data sections is present, and wherein:

if an invalid calculated check value is present, the first predetermined data section is selected as the characterizing data section; and, if a valid calculated check value is present, the second predetermined data section is selected as the characterizing data section;

B) for the selecting, a check is carried out as to whether, when sending the first predetermined data section and when sending the second predetermined data section, an invalid calculated check value for previously sent data sections is present in each case, and wherein:

in a case in which a valid calculated check value is present for one of said first and second predetermined data sections, the other of said first and second predetermined data sections is selected as the characterizing data section, and in a case in which an invalid calculated check value is present in each case, the one of the first and second predetermined data sections is selected as the characterizing data section with which a greater difference from a valid calculated check value for previously sent data sections is obtained, as compared to the other of said first and second predetermined data sections; and C) the first and second predetermined data sections are inverted with respect to each other.

14. A method for operating a communication network, wherein the communication network comprises a plurality of subscribers, the method comprising:

wherein data are exchanged in the communication network between the subscribers in the form of telegrams, wherein the telegrams comprise a plurality of data sections, wherein the subscribers interpret an end portion of the telegrams as a check value for checking an absence of errors in data sections preceding said end portion of the telegrams, wherein the telegrams are processed by the subscribers in pass-through, so that the telegrams are received by the subscribers and are forwarded to a respective next subscriber while being received, wherein the subscribers, in a case in which an error of a telegram is detected when receiving the telegram, perform sending the telegram to a next subscriber with a characterizing data section of the telegram at its end, so that the telegram sent to the next subscriber comprises an end portion representing an invalid check value, wherein the characterizing data section is part of the end portion of the telegram which is interpreted as the check value, wherein by the characterizing data section the telegram is characterized for the next subscriber such that the telegram is not considered as an initial error but as a subsequent error, wherein the subscribers set the characterizing data section by performing a predetermined calculation using at least one previously sent data section, wherein performing the predetermined calculation comprises determining a valid check value for previously sent data sections and forming an alternative value by applying a predetermined calculation algorithm to a partial value of the determined valid check value at an end thereof, and wherein the formed alternative value is set as the characterizing data section.

15. The method according to claim 14, wherein the calculation algorithm is an inversion.

* * * * *